United States Patent
Rose et al.

(10) Patent No.: US 10,540,148 B2
(45) Date of Patent: Jan. 21, 2020

(54) COMPLEX CONSTANTS

(71) Applicant: Oracle International Corporation, Redwood Shores, CA (US)

(72) Inventors: John Robert Rose, San Jose, CA (US); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/726,155

(22) Filed: May 29, 2015

(65) Prior Publication Data

US 2015/0363174 A1 Dec. 17, 2015

Related U.S. Application Data

(60) Provisional application No. 62/011,411, filed on Jun. 12, 2014.

(51) Int. Cl.
*G06F 8/30* (2018.01)

(52) U.S. Cl.
CPC ..................... *G06F 8/31* (2013.01)

(58) Field of Classification Search
CPC .................................................. G06F 8/00–78
See application file for complete search history.

(56) References Cited

U.S. PATENT DOCUMENTS

| | | | |
|---|---|---|---|
| 6,003,038 A | 12/1999 | Chen | |
| 6,031,623 A * | 2/2000 | Smith | G06F 8/65 358/1.14 |
| 6,338,160 B1 * | 1/2002 | Patel | G06F 8/443 712/E9.037 |
| 6,968,549 B1 | 11/2005 | Harscoet | |

(Continued)

FOREIGN PATENT DOCUMENTS

| | | |
|---|---|---|
| CA | 2 759 516 A1 | 5/2013 |
| EP | 0 945 791 A2 | 9/1999 |
| WO | WO 01/55846 A1 | 8/2001 |

OTHER PUBLICATIONS

Lee, Seong-Won, et al. "Code size and performance optimization for mobile JavaScript just-in-time compiler." Proceedings of the 2010 Workshop on Interaction between Compilers and Computer Architecture. ACM. (Year: 2010).*

(Continued)

*Primary Examiner* — Chameli Das
*Assistant Examiner* — Joanne G Macasiano
(74) *Attorney, Agent, or Firm* — Hickman Palermo Becker Bingham LLP

(57) ABSTRACT

In an approach, a virtual machine identifies, within a set of instructions, an instruction to load a constant; identifies, based on the instruction to load the constant, a first entry in a data structure that identifies a particular constant type of the one or more constant types, wherein the first entry specifies at least constant data and a first set of instructions for assembling a value or partial value from the constant data; executes the first set of instructions to assemble the value or the partial value from the constant data; and stores a particular value or a reference to the particular value onto a run-time data structure used to pass values or references between sets of instructions executing in a run-time environment, wherein the particular value is based on the value or the particular value assembled from the constant data.

71 Claims, 9 Drawing Sheets

(56) References Cited

U.S. PATENT DOCUMENTS

| | | | | |
|---|---|---|---|---|
| 7,406,687 B1* | 7/2008 | Daynes | ............... | G06F 9/44521 |
| | | | | 717/118 |
| 2004/0015911 A1* | 1/2004 | Hinsley | ..................... | G06F 8/47 |
| | | | | 717/147 |
| 2006/0242464 A1* | 10/2006 | Holt | ........................ | G06F 15/16 |
| | | | | 714/25 |
| 2010/0115287 A1* | 5/2010 | Betouin | ................ | G06F 21/125 |
| | | | | 713/189 |
| 2013/0139134 A1* | 5/2013 | Burka | ................... | G06F 9/4435 |
| | | | | 717/153 |

OTHER PUBLICATIONS

Bodden, Eric. "InvokeDynannic support in Soot." SOAP@ PLDI. (Year: 2012).*

Chander, Ajay, John C. Mitchell, and Insik Shin. "Mobile code security by Java bytecode instrumentation.", Proceedings DARPA Information Survivability Conference and Exposition II. DISCEX'01. vol. 2. IEEE. (Year: 2001).*

Cramer, Timothy, et al. "Compiling Java just in time.", IEEE Micro; 17.3: Pg. 36-43. (Year: 1997).*

REMI FORAX; JSR 292 Cookbook; A collection of source code showing how to use JSR 292 to implement usual patterns that you can find in dynamic language runtimes.; https://code.google.com/p/jsr292-cookbook/; 2011.

\* cited by examiner

COMPLEX CONSTANTS

PRIORITY CLAIMS; RELATED APPLICATIONS

This application is a non-provisional of U.S. Patent Application No. 62/011,411, filed Jul. 12, 2014, entitled "Complex Constants", the entire contents of which is incorporated for all purposes as though fully stated herein.

TECHNICAL FIELD

Embodiments relate generally to techniques for supporting and/or utilizing complex constant constructs within programming languages.

BACKGROUND

A constant table (also known as a constant pool) is a data structure that stores fixed values in a program. For example, in the context of the Java Virtual Machine, the values stored in the constant pool can represent values that do not charge over the course of execution such as literals (such as strings, integers, double, floats, etc.), field references, method references, interface references, name/type information, and others. One use of the constant table is to provide information regarding the programmer's intent for constant values to the run-time environment executing the program.

The run-time environment can then use that knowledge to create instances of those constant values in static memory for use by the program. Since the constant values are stored in a location where they cannot be changed, the run-time environment is free to reuse those constant values when needed to avoid re-instantiating the constant value for each use (or in some cases the need to track the value for garbage collection). For example, assume the source code of a program defines two variables which both refer to the string literal "hello world". In some run-time environments, such as the Java Virtual Machine, without the use of constants the environment would need to instantiate "hello world" twice and then assign each variable to the memory location of its respective string. However, if the string "hello world" is a constant, the operating environment is free to instead create one instantiation of "hello world" and assign both variables to the same reference. Since the "hello world" string is immutable in memory, there is no risk that an operation might use the first variable to modify the "hello world" string and cause an unintended cross-over effect to the second variable. If an instruction attempts to modify the first variable, a second instantiation representing the modified string is created and the reference stored by the first variable is shifted to the location of the modified string. Thus, constant values serve as an important part of optimizing the execution of programs by conserving memory and preventing work from being needlessly duplicated.

At present, constant tables and the process of loading constants from those constant tables are tailored to specific types of values that are hard coded or supported natively by the run-time environment. These techniques allow the developer of the run-time environment to fine-tune the handling of those constants and develop optimizations specific to a particular type of value. However, the run-time efficiency that can be obtained from utilizing constant values is applicable to virtually any type of value (such as complex numbers, tuples, points, groups, etc.). One issue with expanding the concept of constant values to other types is that it is virtually impossible for the designer of the run-time environment (such as a virtual machine executing the program) to anticipate every type of constant value that could possibly be useful to software developers. Thus, a flexible approach to representing constant values in the constant table and making those constant values available in run-time memory would be a significant advancement in the pursuit of expressive and efficiently executed programs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
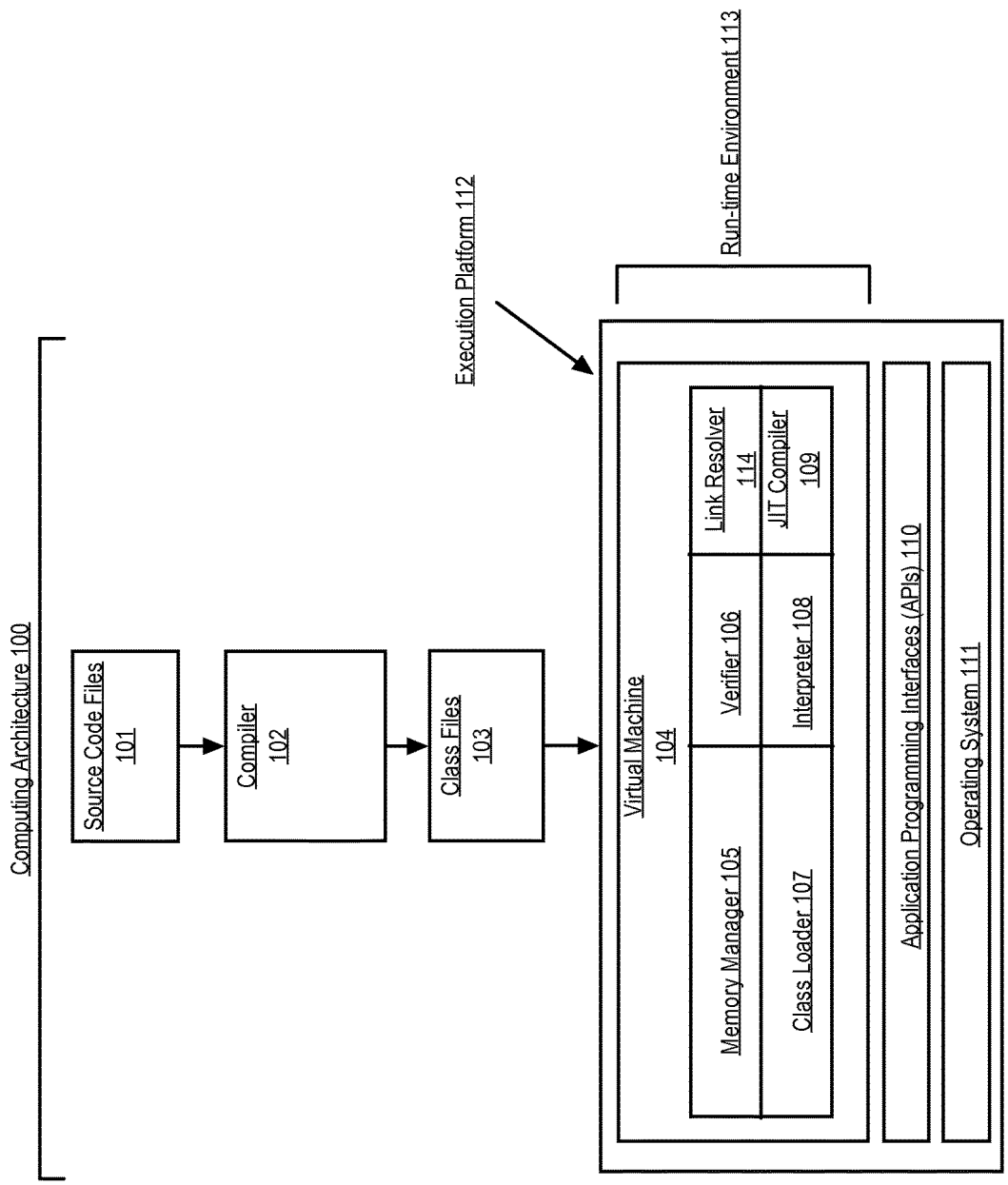
FIG. 1 is a block diagram illustrating an example computing architecture in which certain techniques described herein may be implemented, according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Example Operating Environment
  2.1 Example Class File Structure
  2.2 Example Virtual Machine Architecture
  2.3 Loading, Linking, and Initializing
  3.0 Complex Constants
  3.1 Class File Representation
  3.2 Run-Time Memory Representation
  3.3 Templated Constants
  3.4 Example Compiler Process
  3.5 Example Virtual Machine Process
  3.6 Reference vs. Value Types
  3.7 Composability of Constants
  4.0 Hardware Overview
  5.0 Extensions and Alternatives 6.0 First Additional Disclosure
7.0 Second Additional Disclosure
8.0 Third Additional Disclosure

1.0. General Overview

The techniques described herein use terms and definitions from the Java programming language, the Java Virtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "functions". Furthermore, the term "method" is also synonymous with the terms "class method" or "object method". A method is a set or block of code which is referred to by name and can be called (invoked) at various points in a program, which causes the method's code to be executed. The term "invoke" is also synonymous with the term "call". Thus, when first method "calls" or "invokes" a second method, this represents that the first method causing the second method to be executed.

In an embodiment, the run-time environment provides support for constants of arbitrary types, which are referred to as "complex constants". As a result, the run-time environment can provide constant-like optimizations and behavior even for types that are not "natively" supported by the operating environment.

In an embodiment, a compiler is configured to perform an analysis on source code and generate lower-level instructions, such as bytecode or hardware-level instructions. During the analysis the compiler determines data values that are candidates to become constant values. For example, the user code may include annotations or syntax that specifically designates values as constants. As another example, the compiler may detect aggregations of values where at least part of the aggregation is constant. The compiler can then designate the constant portions of the aggregation as candidates to become complex constants. In an embodiment, the compiler converts the source code files into an intermediate representation, such as bytecode. The examples presented herein assume that the source language is an object oriented language, such as Java, and thus a "class" represents a blueprint for a bundle of data and methods and an object is an instantiation of a class. As a result, the files representing the intermediate representation are referred to as "class files", where each individual file relates to a particular class. However, the techniques discussed herein are not limited to object oriented programming languages and the term "class file" is used as a term of convenience rather than as a limitation.

In an embodiment, each class file is processed by a run-time environment, such as a virtual machine, to generate a representation of the associated class in run-time memory. For example, the run-time environment may be configured to load a class upon the first use of that class by the program. In response to that use, the run-time environment parses the associated class file, allocates memory for the constants, static fields, method code of the class, etc., and then initializes those values. In the case of entries from the constant table, the memory allocated for those constants is protected such that those memory areas cannot be modified. A more thorough explanation is provided below in Section 2.3 "Loading, Linking, and Initializing".

In an embodiment, the class file includes a constant table that identifies the various constant values within the program. For example, each entry in the constant table can represent a fixed integer, double, float, string, long, method reference, field reference, interface reference, and so forth. In an embodiment, entries representing complex constants include the raw data from which to construct the constant and a reference to an assembler method that assembles the complex constant from the raw data. Depending on the embodiment, the raw data can be stored directly in the constant table entry or the raw data can be stored in other constant table entries and represented with a reference or index into the constant table. In some embodiments, the constant table has an entry type referred to as "bytes" which represents a container for storing raw bytes of data. Depending on the embodiment, the assembler method can be derived from the source code, automatically supplied by the compiler, or maintained by the run-time environment. However, for security purposes, some embodiments may choose to have the assembler method supplied only from a select number of sources or even only from the run-time environment itself. In the later cases, the developer of the run-time environment would still need to supply support for the various types of complex constants. However, since a constant table entry for arbitrary types of constants is already available, complex constants provides a convenient framework to extend supported constants without the need to create new entry types.

In an embodiment, when a complex constant is first referenced by an instruction, the run-time environment executes the assembler method. The assembler method reads the raw data and generates the value of the complex constant. That value is then stored in a complex value cache. As a result, future references to the complex constant can be served by returning the cached value rather than repeating the work of executing the assembler method to reconstruct the value.

In some embodiments, the assembler method referenced by the complex constant entry is a metafactory method which, when executed, creates a factory method that returns the value of the complex constant. One reason an embodiment may choose to implement the metafactory technique is to provide support for templated constants. In some cases the source code may include operations or methods that reuse most component parts of an aggregation, but with a few relatively minor changes. For example, the source code may include a method that takes the variable x as input and constructs the array [1,2,x,4]. Without using the templated constant technique, upon receiving the value "3" for x, the run-time environment constructs the aforementioned array by allocating space for the four elements on the heap and then inserting each value into its respective index to create the array [1,2,3,4]. In some environments, such as Java, arrays are represented as Objects and thus the allocation may also include space for header information in addition to the data elements. In this example, the run-time environment stores entries in the constant table for the integers which it uses to individually copy "1", "2", and "4" into their respective spots in the array. However, if another array were constructed with a different value for x, the same process would be repeated to create the new array.

In the example above, the first, second, and forth index of the array is constant and reused between array instantiations. By utilizing templated constants, the run-time environment can reuse some of the work done while creating the first array to create subsequent arrays. This is accomplished by defining a metafactory method that takes the complex value data as input, constructs and caches an array with constant and placeholder values, and then generates a factory method that combines the cached array with the supplied variable values. Thus, for the above example, the compiler creates a constant complex entry that specifies the integers [1], [2], and [4]. The reference to the assembler method is a metafactory which takes the aforementioned data and constructs the array [1, 2, x, 4] where x is a value supplied by popping a value off the operand stack. This partial array is then stored as the cached complex value. In addition, the metafactory method generates and executes bytecode instructions, referred to as a factory method, which performs a block copy of the cached complex value into the new array and then performs individual copies of the variable values in appropriate places by popping those values off the stack. The new array is then returned by pushing a reference to the array onto the operand stack. Once the factory is generated, the reference to the metafactory as the assembler method for the complex constant is replaced with a reference to a factory. As a result, future requests to load the constant results are served by the factory, rather than re-executing the metafactory.

Since a block copy is generally a cheaper operation than multiple individual copies, the run-time environment can efficiently reuse at least part of the work done while creating the first array to create future arrays. For example, if an array consists of 10,000 elements, of which only two elements are supplied by variables, the run-time environment can replace 10,000 individual copy instructions with a block copy instruction of the cached value and two individual copy instructions to replace the placeholders with the values of the supplied variables, As a result, a significant boost to run-time efficiency can be obtained. The aforementioned example is described in terms of arrays. However, the templated constant technique can be applied to any kind of aggregation, such as arrays, groups, tuples, general objects, and so forth without limitation. In some embodiments, to support consistency of design, the metafactory/factory technique described above is used even for constants which do not have variable components. In such cases, the factory method simply returns the cached value without merging that cached value with variable values from the operand stack.

In some cases, using complex constants reduces the overall size of the client code. For example, a program in Java can have a class that initializes the array [1,2,3], which would cause the generation of bytecode instructions for "make a three element array, then store 1 to the first element, then store 2 to the second element, then store 3 to the third element". This is far more verbose than relying on the compiler to create the complex constant entry for the constant array, and outputting a single bytecode instruction which loads the constant represented by that entry.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a run-time environment 113, an operating system 111, and one or more application programming interfaces (APIs) 110 that enable communication between the run-time environment 113 and the operating system 111. The run-time environment 113 includes a virtual machine 104 comprising various components, such as a memory manager 105 (which may include a garbage collector), a verifier 106 to check the validity of class files 103 and method instructions, a class loader 107 to locate and build in-memory representations of classes, an interpreter 108 for executing the virtual machine 104 code, a just-in-time (JIT) compiler 109 for producing optimized machine-level code, and a link resolver 114 for resolving symbolic references to classes and/or methods.

In an embodiment, the computing architecture 100 includes source code files 101 that contain code written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102 or virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (110) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
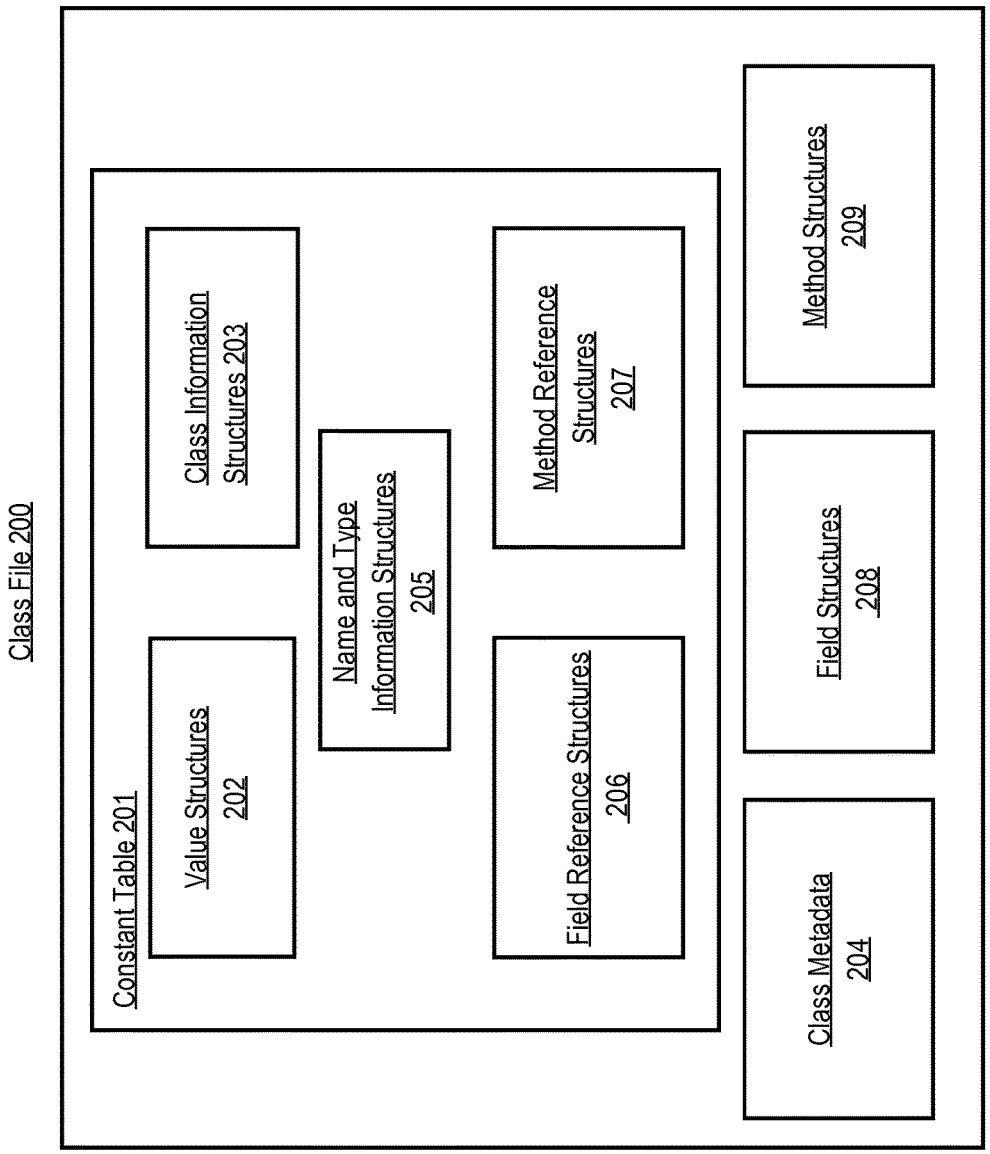
FIG. 2 is a block diagram illustrating an example class file according to an embodiment.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201.

Using Java as an example, consider the following class

```
class A
{
int add12and13( ) {
   return B.addTwo(12, 13);
      }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the run-time environment 113. As will be described in Section 2.3, eventually the run-time representation of the symbolic references are resolved into actual memory addresses by the virtual machine 104 after the referenced classes (and associated structures) have been loaded into the run-time environment and allocated concrete memory locations.

2.2 Example Virtual Machine Architecture

Figure 3:
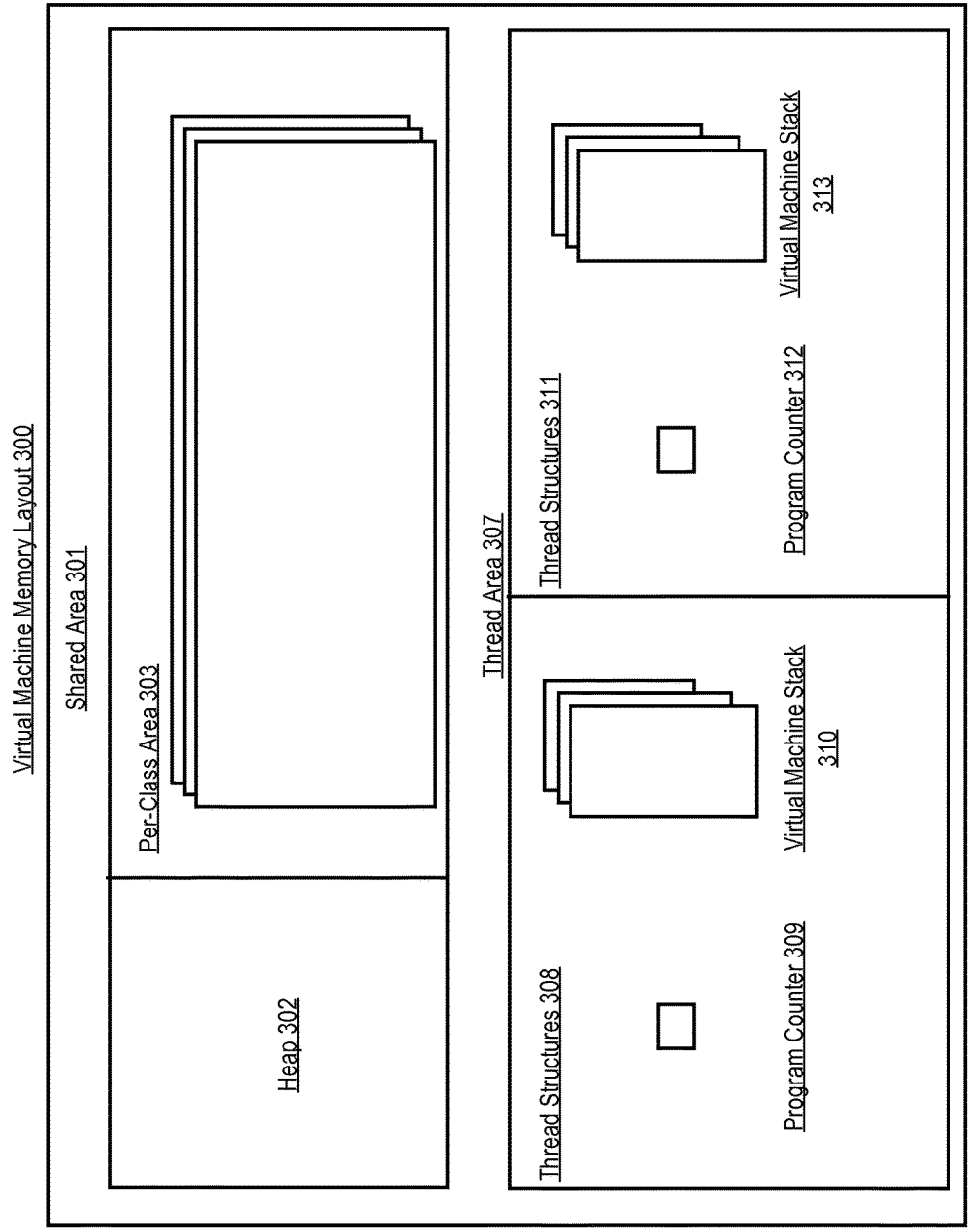
FIG. 3 is a block diagram illustrating example structures for a virtual machine run-time environment according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
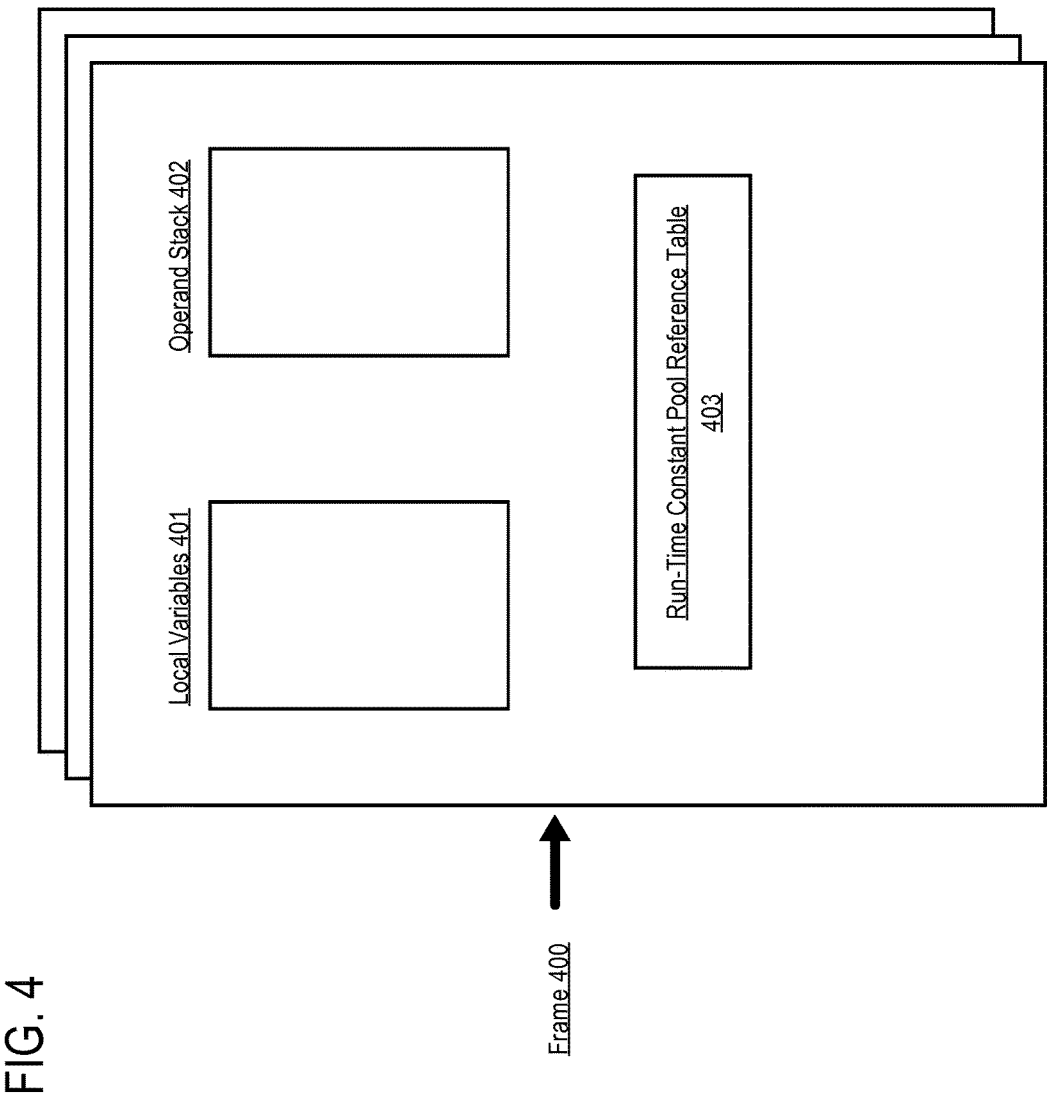
FIG. 4 is a block diagram illustrating an example structure for a frame on a virtual machine stack according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

Although the local variables 401 and the operand stack 402 are referred to using data structures such as "arrays" and/or "stacks", there is no limit to the type of data structure used to implement those elements. In addition, the data structures referred to herein with respect to the local variables 401 and operand stack 402 relate to high level representations of the data structure. Embodiments can implement those data structures using a variety of lower level storage mechanisms, such as storing one or more values of the local variables 401 and/or the operand stack 402 in one or more registers of a central processing unit (CPU) of the machine hardware executing the virtual machine 104.

In an embodiment, the run-time constant pool reference table 403 contains a reference to the run-time constant pool 304 of the current class. The run-time constant pool reference table 403 is used to support resolution. Resolution is the process whereby symbolic references in the run-time constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the run-time environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the run-time constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then passes control to the link resolver 114 which replaces the symbolic references with a reference to the concrete memory location of the referenced class, field, or method. For example, the link resolver 114 may consult metadata, tables, or other information to search and locate the concrete memory location. In an embodiment, the link resolver 114 caches resolutions to be reused in case the same class/name/descriptor is encountered again during execution of the program. In some embodiments, caching is performed by replacing the symbolic reference within the run-time constant pool 304 of the class. However, in other embodiments, a separate caching data structure is used to store pointers to the concrete memory location.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 Complex Constants

In an embodiment, the run-time environment provides support for constants of arbitrary types, which are referred to as "complex constants". As a result, the run-time environment can provide constant-like optimizations and behavior even for types that are not "natively" supported.

For example, consider the case of a map/hash/dictionary constant. In many programming languages, such as Java, it is common to pass a Map<String, String> containing key-value pairs to the initialization of an application programming interface (API). The code in the source code files 101 may appear as:

Map<String, String>config=new HashMap< >( )
config.put("case.sensitive", "false");
config.put("file.root", "/path/to/file/root");
FileReader reader=FileReader.make(config);

When compiled by the compiler 102, the above example code turns into many virtual machine instructions to create a Map, populate the Map, and throw the Map away (e.g. explicitly de-allocate the memory of the Map or cleaning up via a garbage collector). Using "complex constants", embodiments can encode the map as strings (constants) and an aggregation method to generate a "Map constant" from the strings.

As a result, the source code 101 in such embodiments might allow a programmer to represent the "Map constant" with a reduced number of instructions, such as: Map<String, String>config=#{"case.sensitive"=>"false", "file.root"=>"/path/to/file/root"}; and the compiler 102 could translate this statement into a complex constant. Since complex constants are tracked by the constant table/pool of the run-time environment 113 and stored immutably in memory, the virtual machine 104 is free to re-use the Map constant when needed without having to redo the work of recreating/deallocating the map constant. Thus, representing such structures as complex constants reduces the size of the code as well as allows for advances in run-time efficiency.

Although the above example uses a map constant, complex constants can be applied to any number of constant structures without limitation, such complex numbers, tuples, arrays, lists, groups, sequences, generic objects, and so forth.

3.1 Class File Representation

In an embodiment, complex constants are represented in the constant table 201 of the class file 200 in a format that is generalizable to virtually any kind of constant value.

Figure 5:
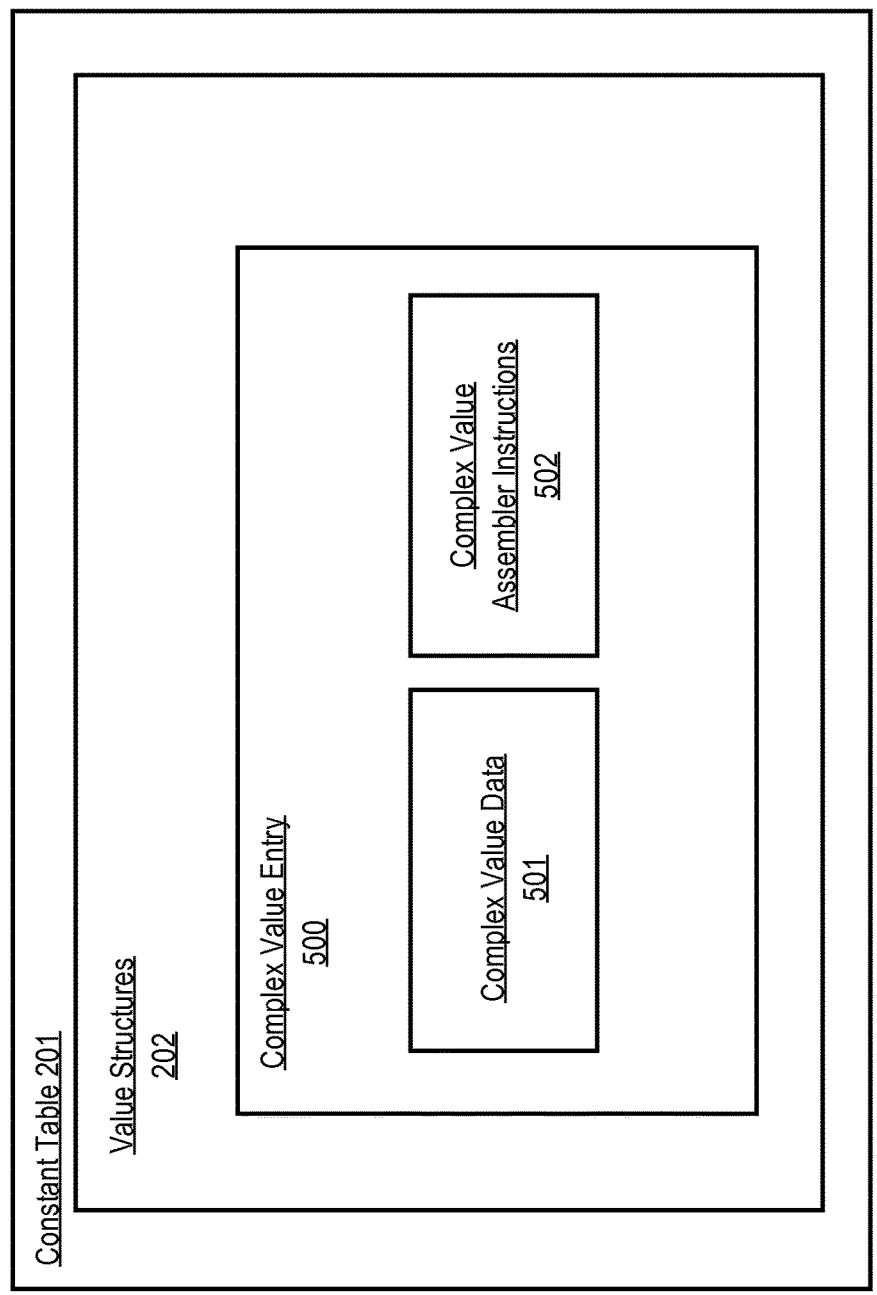
FIG. 5 is a block diagram illustrating an example structure for a complex constant entry of a constant table according to an embodiment.

FIG. 5 is a block diagram illustrating an example complex value entry 500 according to an embodiment. In FIG. 5, the complex value entry 500 is a member of the value structures 202 of the constant table 201. The complex value entry 500 includes complex value data 501 and complex value assembler instructions 502. In FIG. 5, only one complex value entry 500 is displayed to avoid unnecessarily obscuring the diagram. However, the class file 200 may contain virtually any number of complex value entries.

In an embodiment, the complex value data 501 represents the data from which the complex value assembler instructions 502 constructs the value or partial value of the complex constant. In some embodiments, the complex value data 501 stores the raw data of the complex constant. For example, if the complex constant is an array, the complex value data 501 would store the values that make up the array. However, in other embodiments, the complex value data 501 instead stores references or indexes to other entries of the constant table 201. For example, if constructing the array [1,2,3,4], the complex value entry 500 may store indexes into the constant table 201 to other value structures 202 representing the individual integers [1], [2], [3], and [4]. In some embodiments, the value structures 202 of the constant table 201 include an entry type for storing bytes as a container for the raw data. Thus, in such embodiments, the complex value data 501 includes a reference to the byte entry holding the raw data for the complex value entry 500. In some embodiments, the compiler 102 uses a variety of techniques to store the complex value data 501 and chooses which technique to use based on characteristics of the complex constant, such as the size of the raw data. Additional examples regarding the process of the compiler 102 constructing the complex value entry 500 are described below in Section 3.4 "Example Compiler Process".

In an embodiment, the complex value assembler instructions 502 represent a metafactory method that reads the complex value data 501, processes the complex value data 501 into a complex constant value, caches the complex constant value in a complex value cache, and generates a factory method that returns the cached value. In some embodiments, the complex value cache is a region of memory reserved by the virtual machine 104 for storing the cached complex value (or a reference thereto) upon execution of the complex value assembler instructions 502. In some cases, such as for the templated constants described in more detail below in Section 3.3 "Templated Constants", the factory method also combines the cached value with additional variable values on the operand stack 402 before returning the combined value. In some embodiments, the complex value assembler instructions 502, rather than storing the instructions themselves, stores an index to another entry of the constant table storing the instructions or an entry of the method reference structures 207 that holds a symbolic reference to the instructions to be resolved by the run-time environment 113.

In some embodiments, "complex constants" are useful in cases where the inputs are constant (or semi-constant in the case of "templated constants") and the aggregation method is deterministic (repeated executions of the assembler method on the same input produces "equivalent" output). For example, if the assembler method is non-deterministic, such as the assembler method uses the input with a random number generator, the returned value of the non-deterministic assembler cannot be usefully cached. However, the framework for "complex constants" may still be a useful organizational framework for cases where the assembler method is non-deterministic.

Depending on the embodiment, the complex value assembler instructions 502 can be supplied by the source code files 101, automatically generated by the compiler 102 while compiling the source code files 101, or provided by the virtual machine 104. In cases where the complex value assembler instructions 502 is provided from a source outside the run-time environment 113, this allows the writer of the source code files 101 or the developer of the compiler 102 to provide their own behavior and definitions for constant types. However, for security purposes, some embodiments may limit the source of the complex value assembler instructions 502 to trusted sources. Thus, the run-time environment 113 may accept complex value assembler instructions 502 generated by the compiler 102, but may keep the process of generating constants invisible to a user writing the source code. In some cases, the virtual machine 104 may only accept complex value assembler instructions 502 which are in a library provided by the run-time environment 113. In such cases, the range of complex constants will be limited to those envisioned by the developers of the run-time environment 113, but the techniques described herein are still useful to provide a framework that can be conveniently extended to other constant types by adding additional metafactory methods to the library. Thus, there is no requirement to create a different constant table 201 entry type for every type of constant that is later supported.

3.2 Run-Time Memory Representation

Examples of general processes for loading classes (including the constant table 201) into the virtual machine memory layout 300 are described above in Section 2.3 "Loading, Linking, and Initializing". The present section focuses on the representation of complex constants in the virtual machine memory layout 300 of the virtual machine 104.

Figure 6:
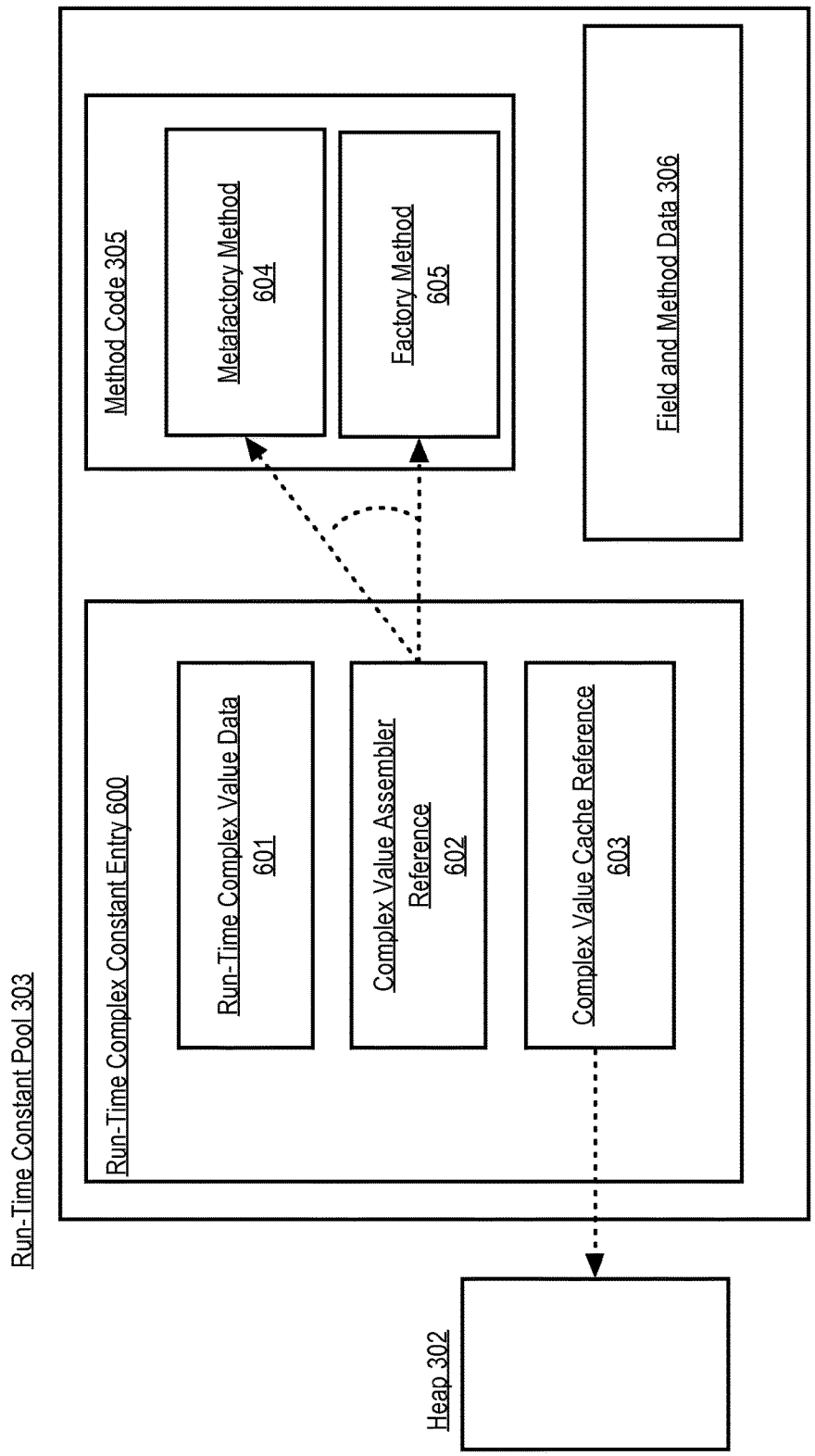
FIG. 6 is a block diagram illustrating the run-time memory representation of a complex constant entry of the constant table 201 according to an embodiment.

FIG. 6 is a block diagram illustrating the run-time memory representation of a complex value entry 500 of the constant table 201 according to an embodiment. In FIG. 6, the run-time complex constant entry 600 includes run-time complex value data 601, complex value assembler reference 602, and complex value cache reference 603.

In an embodiment, the run-time complex value data 601 is the complex value data 501 of the class file 200 that has been loaded into the virtual machine memory layout 300 by the virtual machine 104. Depending on the embodiment, the run-time complex value data 601 mays store the actual data for the complex constant or references to other run-time representations of entries from the constant table 201.

In an embodiment, the complex value assembler reference 602 is initially a reference to the metafactory method 604 stored in the method code 305. The metafactory method 604 represents the complex value assembler instructions 502 that have been loaded into run-time memory. In some embodiments, the complex value assembler reference 602 to the metafactory method 604 is a symbolic reference that is resolved by the virtual machine 104 on first use of the complex constant. Although the metafactory method 604 is depicted as being part of the method code 305 of the same class utilizing the complex constant, other embodiments may store the metafactory method in other classes or in special libraries supplied by the run-time environment. In an embodiment, the complex value assembler reference 602 initially references the metafactory method 604. However, on first use of the complex constant the virtual machine 104 executes the metafactory method 604 to populate the complex value cache reference 603 and generate a factory method 605. The virtual machine 104 then updates the complex value assembler reference 602 to the factory method 605 for future loads of the complex constant. Although the factory method 605 is illustrated as being placed as part of the method code 305, that location is not critical. For example, some embodiments may store the factory method 605 on the heap 302 or any other region in the virtual machine memory layout 300. In some embodiments, the metafactory method 604 supplies the code to populate the complex value cache reference 603, update the complex value assembler reference 602 to point to the generated factory method 605, and execute the factory method 605. However, in other embodiments, one or more of the aforementioned steps are performed by code belonging to the virtual machine 104 that is separate from the code of the metafactory method 605.

In an embodiment, the complex value cache reference 603 is a reference to a cached value for the complex constant created by executing the 604 initially referenced by the complex value assembler reference 602. Thus, in some embodiments, the complex value cache reference 603 is initially null and is updated to point to the location of the value generated by the metafactory method 305. In the example of FIG. 6, the complex value cache reference 603 references a cached value that has been allocated and stored on the heap 302. For some languages, such as Java, aggregates such as arrays, objects, and so forth are reference types and are instantiated on the heap 302. Thus, FIG. 6 is an example of a case where the metafactory method 604 instantiates the cached complex value on the heap 302 and stores a reference to that location in the complex value cache reference 603. However, in other embodiments, the cached value may be stored in place in run-time constant complex entry 600, rather than by stored by reference. Furthermore, some embodiments dynamically switch between both representations depending on the size and complexity of the complex constant being represented.

3.3 Templated Constants

In an embodiment, the run-time environment 113 supports "templated constants" for the creation of values where part of the value is constant and the rest is supplied by one or more variables.

In an embodiment, templated constants are supported by converting such partial constants into complex value entries where the complex value data 501 identifies the constant and non-constant portions of the aggregate and the complex value assembler instructions 502 are configured to cache an intermediate result with placeholder values. In such embodiments, the factory method 605 generated by executing the metafactory method 604 represented by the complex value assembler instructions 502 is configured to perform a block copy of the cached value, and then perform additional individual copies to fill in the placeholder values with values supplied by the variables. For example, by popping values off of the operand stack 402.

Consider the following example code:
int x= . . .
int[ ] a={1, 4, x, 10};

In the example code above, a is an array of four elements, where the first, second, and forth index are constant and the third index is supplied by the variable x.

In an embodiment, the compiler 102 represents the above array in a complex value entry 500, where the complex value data 501 specifies that the first index is the integer "1", the second index is the integer "4", the third index is to be supplied by a variable, and the forth index is the integer "10". The metafactory method 604 represented by the complex value assembler instructions 502 is configured to read the complex value data 501 and instantiate/cache an array of [1, 4, P, 10], where P is a value reserved for placeholders and/or associated with metadata indicating it is a placeholder. In addition, the complex value assembler instructions 502 are configured to generate a factory method 605 that instantiates a new array by performing a block copy from the cached array to the new array and performing an individual copy from the variable x into the third index.

As a result, during run-time, the first time [1, 4, x, 10] is used by the virtual machine 104, the metafactory method 604 initially referenced by the complex value assembler reference 602 is executed to create the cached partial array and the factory method 605 described above. The complex value assembler reference 602 is then updated with a reference to the factory method 605. The virtual machine 104 then executes the factory method 605, which then creates the array for the current value of x (e.g. by popping a value off the operand stack 402), and returns a reference to that array by pushing the reference onto the operand stack 402. The method that issued the load constant instruction can then manipulate the reference on the operand stack 402 by, for example, assigning the reference to a local variable.

In some embodiments, in the case of templated constants, the virtual machine 104 expands the complex value cache reference 603 to store more than one cached value. When new values are instantiated by the factory method 605 those values are also cached in locations pointed to by the complex value cache reference 603. Thus, if the same variable values are reused, the virtual machine 104 can return the already constructed values for those particular variable values.

In some embodiments, by using templated constants, the size of the client code is reduced compared to non-templated techniques. For example, by using templated constants, the virtual machine 104 instructions to create the constant value can be reduced to instructions to push the variable components onto the operand stack 402 followed by the load constant instruction referencing the corresponding complex value entry. If the same data structure were created using a generic method to take one or more components and return a data structure initialized with those components, the method may require all the components (both constant and variable) to be pushed onto the operand stack 402 before the method is invoked. Thus in some embodiments, by using templated constants, the compiler 102 only needs to emit instructions to push variable values to replace the placeholders onto the operand stack 402, thus reducing the total size of the emitted code.

The above example is described in terms of an array. However, the technique is applicable to virtually any kind of values or aggregates, such as complex numbers, groups, dictionaries, and so forth.

As another example, consider the following complex number:
int x= . . . .
ComplexNum a=x+5i;

In an embodiment, the compiler 102 represents the complex number a in a complex value entry 500, where the complex value data 501 specifies that the first value (representing the real component) is to be supplied by a variable and the second value (representing the imaginary component) is located at an index into the constant table 201 of an integer entry storing "5". The metafactory method 604 represented by the complex value assembler instructions 502 is configured to read the complex value data 501 and instantiate/cache a ComplexNum data structure where the real component is the value P and the imaginary component is the value 5, where P is a value reserved for placeholders and/or associated with metadata indicating it is a placeholder. The metafactory method 604, when executed, generates a factory method 605 configured to read a value from the operand stack 402 and construct a new ComplexNum using a block copy of the cached value and an individual copy to replace the placeholder value P with the value read from the operand stack 402. After the first execution, the complex value assembler reference 602 to point to the generated factory method 605. As a result, future executions of assignments of the form "x+5i" are performed by utilizing the generated factory method and the partial result cached by the metafactory method 604.

3.4 Example Compiler Process

Figure 7:
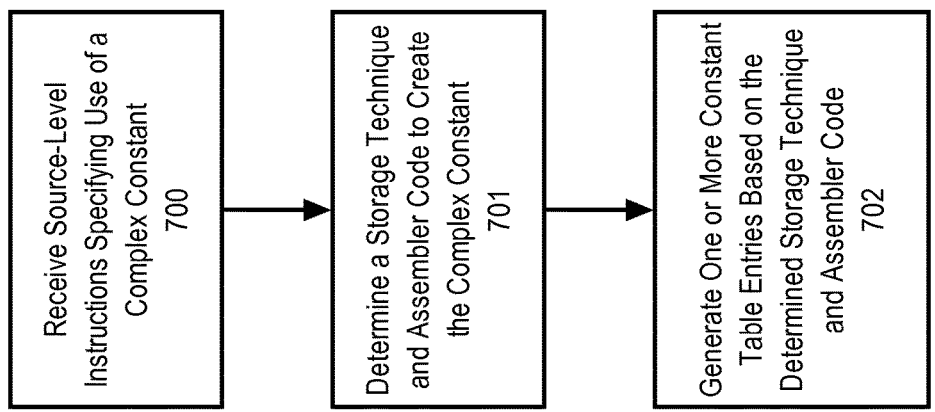
FIG. 7 is a block diagram illustrates an example process of creating a class file with complex constant entries according to an embodiment.

FIG. 7 is a block diagram illustrates an example process of creating a class file with complex constant entries according to an embodiment. The following explanation assumes that the process depicted in FIG. 7 is performed by the compiler 102 while converting the source code files 101 into class files 103.

At block 700, the compiler 102 receives source-level instructions specifying use of a complex constant. In an embodiment, the compiler 102 receives the source code files 101 and parses the instructions contained within the source code files 101 to create the class files 103. While parsing the source code files 101, the compiler 102 detects, for a particular instruction, that the instruction is performing an assignment or otherwise loading a constant value. In some embodiments, the compiler 102 stores a set of rules which it compares against the instruction utilizing the constant value. For example, the compiler 102 may be aware of the constant types that are natively supported by the virtual machine 104 and therefore can be encoded using their respective entry types in the constant table 201. Thus, the rules of the compiler 102 may specify that constants of types known to be natively supported are to be encoded using the native types, rather than as a complex constant type in the constant table 201. However, the rules of the compiler 102 may also specify specific syntax that identifies constants that are not of types known to be native to the virtual machine 104. In such cases, the compiler 102 converts those constants to entries following the format of complex value entry 500. The exact complex constants supported by the compiler 102 is implementation specific, but the techniques described herein can be applied to virtually any type of complex constant the developer of the compiler 102 wishes to support.

For example, the compiler 102 may be configured to identify complex number constants and convert those constants to complex value entries in the class file 200. For instance, the syntax "ComplexNum=6+9i" could indicate that ComplexNum should be set to reference an instance of a complex number where the real portion is '6' and the imaginary portion is '9i'.

As another example, the compiler 102 may be configured to identify group constants and convert those constant groups to complex value entries in the class file 200. For instance, the syntax "G={1, true, "hello"}" could indicate that G should be set to reference an instance of a group containing the integer '1', the boolean 'true', and the string 'hello'.

As yet another example, the compiler 102 may be configured to identify partial constants to use as candidates for the templated constants described above in Section 3.3. For instance, for any complex constant supported by the compiler 102, instructions which follow the proper syntax, but which use variables to supply a portion of the constant, can be identified as candidates for templated constants.

At block 701, the compiler 102 determines a storage technique and assembler code to create the complex constant. In an embodiment, the compiler 102 determines a storage technique based on factors of the complex constant such as number of elements, space required, type of constant, and so forth. For example, if the space required to store the complex value data 501 is below a particular threshold and the component parts are representable using native types, the compiler 102 may generate additional entries in the constant table 201 for those component parts and store indexes to those entries in the complex value data 501. Otherwise, the compiler 102 may generate a "byte" entry for the constant table 201 to use as a raw container for the data and store an entry to the "byte" entry in the complex value data 501. Alternatively, some embodiments may store the data used to generate the value of the complex constant directly in the complex value data 501.

In an embodiment, the compiler 102 stores one or more rules that map particular instances of syntax to metafactory code used to process the associated type of complex constant. Thus, in such embodiments, the compiler 102 uses the one or more rules identify a constant type for particular instruction syntax and determine the metafactory code to place or reference in the complex value assembler instructions 502. In some embodiments, multiple metafactories are defined for each complex constant type to handle the various formats in which the data for that complex type may be stored. For example, one metafactory may be configured to handle the case where the complex value data 501 references native constant table 201 entries for the component parts of the constants and another metafactory may be configured to handle the case where the complex value data 501 references a byte entry containing the raw bytes of data.

For example, in the case of complex numbers, the compiler 102 might choose to generate two integer entries in the constant table 201 representing the real and imaginary parts of the complex number. Thus, when generating the complex value entry 500 for the complex number, the complex value data 501 stores references to the two integer entries. Furthermore, the compiler 102 based on the syntax of the instruction identifies the constant type as a complex number and stores or references in the complex value assembler instructions 502 a metafactory configured to process complex numbers when the data is stored in two integer entries.

As another example, in the case of groups, the compiler 102 might choose to generate a byte entry in the constant table 201 that stores the raw data for the elements of the group. Thus, when generating the complex value entry 500 for the complex number, the complex value data 501 stores a reference to the bye entry. Furthermore, the compiler 102 based on the syntax of the instruction identifies the constant type as a group and stores or references in the complex value assembler instructions 502 a metafactory configured to process groups when the data is stored in a raw byte container.

At block 702, the compiler 102 generates one or more constant table entries based on the determined storage technique and assembler code. In an embodiment, the compiler 102 generates the complex value entry 500 for the complex constant by storing the data or references to the data in the complex value data 501 and the metafactory method or a reference thereto in the complex value assembler instructions 502. Furthermore, depending on the selected storage technique, the compiler 102 may generate other entries of the constant table 201 to be referenced by the complex value data 501, such as "byte" entries or entries representing native types of the virtual machine 104.

In some embodiments, for templated constants, the compiler 102 is configured to generate additional instructions for the method using the templated constant that pushes the value of the variables onto the operand stack 402 from which the factory method can obtain those values.

3.5 Example Virtual Machine Process

Figure 8:
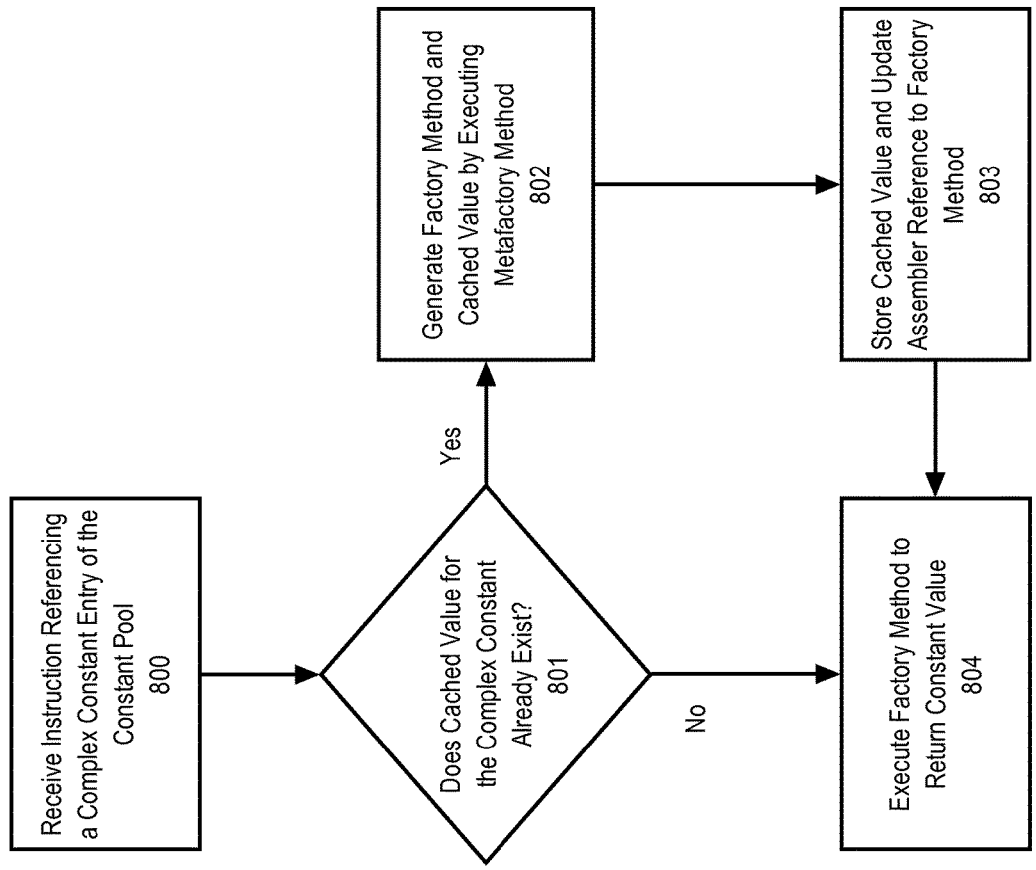
FIG. 8 is a block diagram illustrating an example process for loading a complex constant according to an embodiment.

FIG. 8 is a block diagram illustrating an example process for loading a complex constant according to an embodiment. In FIG. 8, it is assumed that the process is performed by the virtual machine 104 while executing the program represented by the class files 103. In addition, in order to avoid unnecessarily complicating the examples, many steps discussed above in relation to the loading, linking, and initialization process are omitted from the explanation. The examples below assume that the class file 200 for the class utilizing the complex constant has already been loaded into the run-time memory represented by the virtual machine memory layout 300. Furthermore, the example assumes that the virtual machine 104 is interpreting the program via the interpreter 108, but the technique is equally applicable to when the program or portions of the program are compiled via the JIT compiler 109 before execution.

At block 800, the virtual machine 104 receives an instruction referencing a run-time complex constant entry 600 of the run-time constant pool 304. In an embodiment, the virtual machine 104 receives an instruction that takes as input an index into the run-time constant pool 304 and pushes the value of the constant referenced by the entry onto the operand stack 402. For example, to assign a value from the run-time constant pool 304 to a local variable, the virtual machine instructions comprising the method may comprise an instruction to load the constant and another instruction to assign that constant to the local variable. For example, in the context of the JVM, this would be represented by an ldc instruction referencing the entry of the run-time constant pool 304 followed by an astore instruction indicating the index of the local variable within the local variables 401. In this case, it is assumed the run-time constant pool 304 entry referenced by the instruction received by the virtual machine 104 is run-time complex constant entry 600.

In an embodiment, the load constant instruction of the virtual machine 104 is overloaded to work with multiple types of constants. Thus, for example, the virtual machine 104 may consult metadata associated with the referenced run-time constant pool 304 entry to determine the type of the constant. The load constant instruction then follows an execution path for loading a constant of that particular type. However, in other embodiments, the virtual machine 104 supports multiple instructions, each pertaining to a different type or categories of constants. For example, an instruction for native constants, an instruction for complex constants, an instruction for templated complex constants, and so forth.

At block 801, the virtual machine 104 determines whether the run-time complex constant entry 600 has a cached value. If the run-time complex constant entry 600 has a cached value, the virtual machine 104 proceeds to block 802. If the run-time complex constant entry 600 does not have a cached value, the virtual machine 104 proceeds to block 804. In an embodiment, the virtual machine 104 checks the complex value cache reference 603 of the run-time complex constant entry 600 to determine whether the run-time complex constant entry 600 contains a reference to the cached value. If this is the first time the complex constant is utilized, the complex value cache reference 603 will be null. Otherwise, the complex value cache reference 603 will point to the location of the cached value, which in this example is located on the heap 302.

At block 802, the virtual machine 104 executes the metafactory method referenced by the complex value assembler reference 602 to generate a factory method 605 and a value for the complex constant. In an embodiment, the virtual machine 104 executes the metafactory method 604 initially referenced by the complex value assembler reference 602 of the run-time complex constant entry 600. The metafactory method 604 reads the run-time complex value data 601 and constructs a value for the complex constant. For example, the metafactory method may allocate space for the value on the heap 302 and then populate that space with values from the run-time complex value data 601. In addition, the metafactory method 604 generates a factory method 605 that returns the value constructed by the metafactory method 604. In embodiments which implement templated constants, if the complex constant is a templated constant the value constructed by the metafactory method 604 contains one or more placeholder values to be supplied by one or more variables. Furthermore, in such cases, the factory method 605 is configured to combine the value generated by the metafactory method 604 with one or more variable values (for example, from the operand stack 402) to create a new value to return to the method loading the constant (for example, by pushing a reference to the new value on the operand stack 402).

At block 803, the virtual machine 104 stores the generated value and updates the complex value assembler reference 602 to reference the generated factory method 605. In an embodiment, the virtual machine 104 updates the complex value cache reference 603 to point to the generated value and updates the complex value assembler reference 602 to point to the factory method 605.

At block 804, the virtual machine executes the factory method 605 to return the value of the complex constant. In an embodiment, the factory method 605 returns the value by pushing a reference to the value on the operand stack 402. However, in the case of templated constants, the factory method 605 allocates space for a new value (for example, on the heap 302), performs a block copy of the value referenced by the complex value cache reference 603 to the new value's location, and then performs additional copies to replace placeholder values with variable values popped from the operand stack 402. The factory method 605 then returns a reference to the new value's memory location, for example by pushing the memory address of that location onto the operand stack 402. The method loading the complex constant can then perform operations on the value stored on the operand stack 402, such as loading that value into a local variable.

In some embodiments, the instruction referencing the run-time complex constant entry 600 at block 800 includes one or more additional parameters that affect the manner in which the factory method 605 returns the value of the complex constant. For example, the instruction referencing the run-time complex constant entry 600 may indicate that the returned value should be mutable. In some embodiments, in such cases, the factory method always stores the value of the complex constant in a mutable data location, even in cases of non-templated constants. Thus, the method loading the complex constant can mutate the value located at that reference without risking cross-over effects with other variables.

3.6 Reference Vs Value Types

For some languages, such as the Java programming language, types that are not primitive are instead reference types. Reference types are passed by reference on the operand stack 402 (pushed and popped as a reference) and are stored as references in containers such as other Objects. The previous explanation of the process of loading constants assumes that the generated constant values are reference types. However, in other embodiments, the complex constant types may be treated as primitives.

In some embodiments, instead of passing the value of the complex constant by reference, the complex constant is passed by value. For example, the complex constant values pushed on/popped off the operand stack 402 by the factory method 605 or placed within local variables 401 or containing Objects are done so by value, rather than by reference. Furthermore, in some embodiments, the virtual machine 104 freely switches between pass by value and pass by reference semantics based on the size and complexity of the complex constant. For simpler complex constants, where the number of elements and/or size is below a particular threshold, the virtual machine 104 uses pass by value semantics. However, where the number of elements and/or size is above the particular threshold, the virtual machine 104 uses pass by reference semantics. In some cases, pass by value semantics are preferred when the complex values are relatively small and easy to fit in the operand stack 402 and/or local variables 401 since it removes a level of indirection that would otherwise be performed if the value were passed by reference. However, when the complex constant has too many components or is too large, the act of copying the value of the complex constant to/from the operand stack 402 the benefit of removing the indirect reference is overshadowed by the overhead of copying. In some embodiments, the virtual machine 104 provides complex constants for value types as described in U.S. patent application Ser. No. 14/699,129, entitled "Handling Value Types" by John R. Rose et al., filed Apr. 29, 2015, which is hereby incorporated by reference for all purposes as though fully stated herein.

3.7 Composibility of Constants

In some embodiments, complex constants are composible, meaning that a complex constant can use other complex constants as part of the complex value data 501 from which the value is generated. For example, the complex value data 501 may reference other constant table 201 entries representing other complex value entries in addition to or instead of other constant table 201 entries representing natively supported types. In such embodiments, loading a complex constant that is dependent on other complex constants causes a recursive chain of loads.

As an example, consider the creation of a complex constant G([1,2,3], 5, "Hello World"), which is a group consisting of an array [1,2,3], an integer [5], and a string "Hello World". In the run-time complex value entry 600 for G, the run-time complex value data 601 references three entries of the run-time constant pool 303, the first Entry "A" is another complex value entry that references integer entries for "1", "2", and "3", the second Entry "B" is the integer entry for "5", and the third Entry "C" is a string entry for the string "Hello World". In addition, assuming this is the first load of G, the run-time complex value entry 600 for G includes a complex value assembler reference 602 that initially points to a metafactory method 604 that loads Entry A, Entry B, and Entry C, generates the group G, caches the resulting group, produces a factory method 605 that returns the group data structure by pushing a reference to the cached group onto the operand stack 402, updates the complex value assembler reference 602 to reference the produced factory method 605, and executes the factory method 605.

In order to load Entry A, the run-time environment 113 recursively executes the method referenced by Entry A. If this is the first time loading the complex constant represented by Entry A, the reference will lead to a metafactory method that generates the array [1,2,3] from the specified integer entries and constructs/executes the factory method, otherwise the reference will lead to a factory method that returns the cached result via the operand stack 402. In either case, the execution path will lead to a reference to the array [1,2,3] being placed on the operand stack 402 for consumption by the metafactory method 604 of the run-time complex value entry 600 for G.

Although the previous example describes only two layers of complex constants, other embodiments may contain virtually any number of complex constant layers as complex constants build on top of one another. Furthermore, composible constants are compatible with the templated constants mechanism described above in Section 3.3. For example, the higher level factory method may pass one or more variable values down to the next lower level of factory method to use when generating values.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
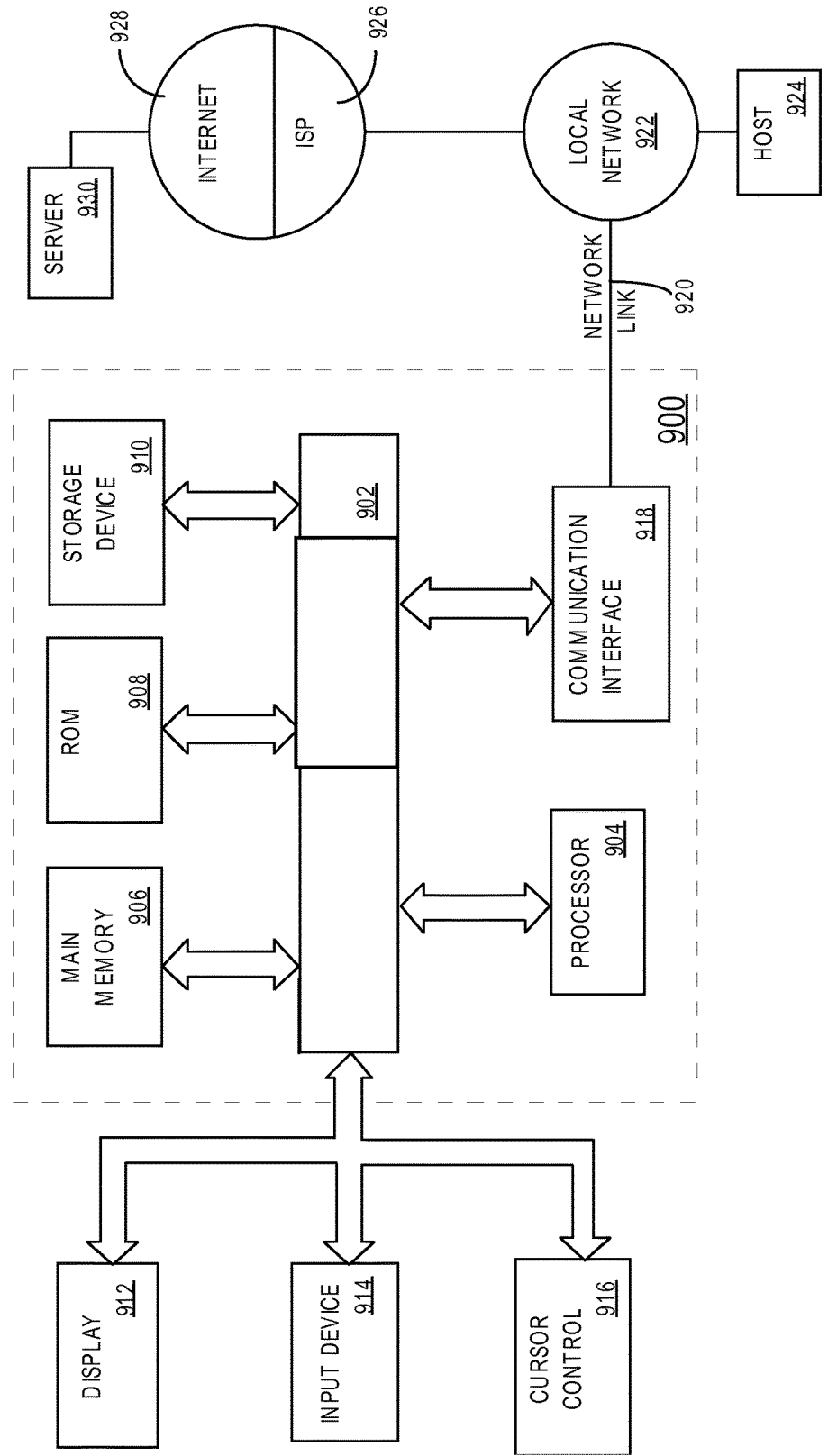
FIG. 9 is a block diagram illustrating one embodiment of a computer system suitable for implementing methods and features described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a light emitting diode (LED) display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

6.0 First Additional Disclosure

Techniques are described herein for structuring and utilizing static data areas in association with program data so as to, among other purposes, facilitate the use of array constants and other complex constants.

According to an embodiment, a method comprises identifying, within a set of instructions, an instruction to load data. For instance, an interpreter, such as a Java Virtual Machine ("JVM"), may be interpreting lower-level compiled instructions (e.g. not human readable source code), such as Java bytecode. The interpreter may encounter an instruction to load data into a run-time data area, such as an operand stack, register, heap, etc. Examples of such instruction, in an embodiment based on the Java programming environment, might include "ldc" or "invokedynamic."

The method further comprises identifying a first entry within a static data area, the first entry being associated with the instruction. For instance, the set of instructions may have one or more associated read-only areas of program data, such as a constant pool within the same Java .class file as the set of instructions being executed. The instruction may specify an address for the entry in a parameter following or otherwise associated with the instruction.

The method further comprises identifying the first entry to be specifying information that indicates at least: (a) method specifying information that references or specifies a location of method code configured to direct the generation of an array structure; and (b) value specification information specifying values to include in the array structure. In an embodiment, to support the identification process, the first entry may be of a designated type (e.g. a pre-defined constant pool entry type, such as CONSTANT_Dynamic). The specifying information may indicate (a) and (b) directly, and/or by explicit or implicit reference(s) to other structures, such as to another entry in the static data area and/or to an entry in a bootstrap attribute structure. The method-specifying information may reference a variety of forms of suitable method code, such as, for instance, method code implementing a metafactory configured to generate and/or return additional method code configured to generate the array structure, method code implemented by a factory, method code for a bootstrap method configured to generate the array structure, method code for a method handle to a method configured to generate the array structure, and so forth. The value specifying information may be, for instance, a sequence of the values, a sequence of references to other entries in a static data area that each store a value individually, and/or reference(s) to other entr(ies) in a static data area that store bits representative of a group of values.

The specifying information optionally further indicates parameter-specifying information that specifies one or more parameters, such as static arguments, to pass to the method code, configured to affect the manner in which the array structure will be generated. For instance, the parameter-specifying information may specify type(s) of values in the array structure, whether the values in array structure will be immutable, and so forth. In an embodiment, some or all of these characteristics may be indicated at an array index-by-index granularity, such that certain indexed elements may be of one type, while other indexed elements may be of another type. In an embodiment where the array will be generated by additional method code produced by a metafactory, the one or more parameters are static parameters that are passed to the metafactory, and the metafactory is configured to generate different array-forming method code based on the values of the one or more parameters. The additional method code produced by the metafactory may itself be configured to take dynamic parameters at run-time that affect array generation. In embodiments where the array will be generated directly by the referenced method code indicated in the method-specifying information, the referenced method code comprises logic that generates different arrays depending on the value of the different parameters.

The method further comprises executing the method code using the values, and optionally the parameters, to generate the array structure. Optionally, depending on the instruction, various actions may be performed with the array structure, such as pushing the array structure onto a stack or other writeable run-time data area, and popping the array structure from the stack or run-time data area based on another instruction in the set of instructions.

In an embodiment, the specifying information further indicates that at least one value of the array is to be retrieved from a dynamic data area (e.g. the operand stack, registers, etc.). Hence, the array is deemed a semi-constant array, or template, in which certain elements are static and other elements are dynamically populated according to the execution of the program data.

According to an embodiment, another method comprises identifying, within a static data area, a first entry that comprises a particular attribute that references a second entry in the static data area. The method further comprises determining that the second entry is of a data type that corresponds to a group of constant values. For instance, the second entry may be of a designated type that indicates that it corresponds to a group of constant values (e.g. a pre-defined constant pool entry type, such as CONSTANT_Group). The method further comprises identifying a plurality of attributes within the second entry, each attribute of the plurality of attributes referencing a different entry in the static data area from which a value corresponding to the attribute is found. The method further comprises substituting the plurality of attributes for the particular attribute.

In an embodiment, the plurality of attributes corresponds to constant values to include in an array. For instance, the plurality of attributes may correspond to values specified by the value specifying information above, and thus be used to generate an array structure such as generated above.

In an embodiment, a second particular attribute of the plurality of attributes refers to a third entry of the static data area that corresponds to another group of constant values. Thus, through chains of entries, any number of attributes may be referenced.

According to an embodiment, another method comprises identifying, within a static data area, a first entry that comprises a particular attribute that references a second entry in the static data area. The method further comprises determining that the second entry is of a particular data type that corresponds to a group of constant values. For instance, the second entry may be of a designated type that indicates that it contains a sequence of bytes that can be parsed to yield the group of constant values (e.g. a pre-defined constant pool entry type, such as CONSTANT_Bytes). The method further comprises passing a sequence of bytes in the second entry to method code. For instance, the sequence of bytes may be passed as a single attribute that is passed to the array generating method code described above, or into any other bootstrap method). The method code is configured to parse the sequence of bytes and interpret the sequence of bytes as a sequence of values. In this manner, multiple values are effectively stored directly within a single entry of a static data area, as opposed to a collection of entries.

In an embodiment, the sequence of values is at least a subset of the values specified by the value specifying information of described above.

In an embodiment, the logic by which an interpreter (e.g. a component that is executing a set of instructions that reference entries from the static data area) interprets entries of the particular data type is linked dynamically. Thus, sequences of bytes in different entries of the same particular data type (e.g. CONSTANT_Bytes) are interpreted according to different logic on account of the method code to which the entries are being passed, and/or on account of other attributes (such as array value type information) passed to the method code.

In an embodiment, a method comprises, responsive to identifying a higher-level instruction to create an array comprising static values generating lower-level instruction(s) that include any one or more of the instructions described above, and generating a static data area comprising any one or more of the entries described above. For instance, a compiler may perform this method in response to identifying a constant array declaration while compiling human-readable source code (e.g. in the Java programming language) to a lower-level set of instructions such as Java bytecode.

Depending on the embodiment and programming environment, the "static data area" referred herein may take a variety of forms. In some embodiments, the static data area is the constant pool of a Java .class file, potentially in combination with a number of auxiliary static data structures within the Java .class file that are addressable by entries in the constant pool. Other embodiments may utilize, in place of a constant pool, any read-only memory area for program data (as opposed to a writeable memory area for program data). Such memory areas may be, for instance, collections of fixed data that are separate from the set of instructions being executed, but addressable by the set of instructions. As another example, such memory areas may be an ordered set of literal/constant values referenced by the executed set of instructions. In embodiments, a static data area may be any data that has been prepared (via compilation, interpretation, or otherwise) for consumption by a virtual machine or interpreter during execution of instructions, that use or otherwise reference values from the data.

In an embodiment, the constant pool may be utilized to generate constant arrays and/or other complex constants without necessarily adding a new directive to the constant pool that identifies an entry as being a constant array. To this end, existing functionality of an interpreter (such as the Java virtual machine) with respect to the constant pool is leveraged. Rather than adding fixed constant array generation logic to the interpreter, tied to a specific type of entry in the constant pool, an entry "represents" a complex constant by referencing a metafactory, or one of a handful of metafactories. A metafactory may, in turn, be configured to generate different implementations of the constant array generation logic (or complex constant generation logic) based on static parameter(s) in the constant pool. This embodiment offers the additional flexibility of being easily adaptable to new types of complex constants, so as to avoid the need to add a number of additional constant pool directives to accommodate access the wide variety of complex constant generation logic needed to support a wide variety of constant array or complex constant types. Of course, in other embodiments, a constant pool may include one or more types of entries that specifically correspond to directives to generate a constant array or other complex constant.

Though certain techniques are specifically described herein with respect to a Java constant pool, it will be appreciated that a constant pool is only an example type of memory area with respect to which the techniques described herein may be practiced, and in other embodiments the techniques are equally applicable to any of the static data areas described above.

In other aspects, systems of computing devices and computer-readable media are disclosed for implementing the techniques described herein.

8.0 Second Additional Disclosure

According to an embodiment, one problem addressed by the techniques described herein is that of supporting array constants in the constant pool. In other embodiments, the techniques described herein are suitable to address a range of other problems, such as arbitrary constant types, and even semi-constant templates.

Conventional constant pools and other read-only memory areas for program data have a native ability to represent a small variety of constant values, including primitives, classes, strings, and method handles. Matching these capabilities to the full range of possible frozen array constants is challenging. For example, the following Java expression is problematic:

final Object final[ ] THREE_THINGS={false, '1', short-.class};

The constant expression 'false' converts to 'Boolean. FALSE', and neither value is directly representable in a constant pool. The code point for the digit "1" (49) can be represented in the constant pool as an int (though it is rather bulky at five bytes), but the boxed value 'Character.valueOf ('1')' is nowhere to be found. Although 'CONSTANT_Class' constants can encode many classes, they cannot (currently) express the primitive 'Class' object for 'short'.

To simplify implementation, one may restrict array constants to arrays of primitive value types. But even then there may be problems. A naive representation of an array of 'long's will burn 64 bits in the class file per element, regardless of the actual dynamic range of the array. Static class size can affect start-up performance, and we do not to drive users away from the new mechanism by making it needlessly bulky.

At this point, 'invokedynamic' offers a good alternative. A suitable range of static representations for array constants (and any other constants!) are produceable using a range of useful metafactories, each of which can link a constant-producing 'invokedynamic' call site. The static metadata passed to each metafactory can be (almost) any sequence of constants from the constant pool. The runtime library, not the JVM, may define this range of array constant metafactories. This pushes the representation problem, from the JVM and its class file format, up to the libraries. This scheme is much more future-proof, and can represent future types (like flat value-array constants) without new constant pool constants.

In an embodiment, implementation may be supported by the addition of only two constant entry pool types (i.e. the type of data to which a given entry in a constant pool conforms, sometimes referred to herein simply as a "constant type"): one a source of raw bits, and one a bundle of constant pool constants with a function to assemble them into a constant. Surprisingly, neither of this constant pool types maps to what one would want to call 'CONSTANT_Array'.

A 'CONSTANT_Dynamic' (new constant tag 17) would resolve to the result of executing a bootstrap method (metafactory) on a specified set of arguments. The first parameter to the 'CONSTANT_Dynamic' would be a bootstrap specifier, the same as the first component of 'CONSTANT_InvokeDynamic'. The second parameter would be a 'CONSTANT_Class', giving the expected type of the constant. Resolving this constant (the first time) would execute the bootstrap specifier. Instead of returning a 'CallSite' object (as the 'invokedynamic' instruction requires) the bootstrap method would return a value which would be immediately converted to the required type.

In an embodiment, the second operand may be derivable from the return type of the bootstrap method, but in other embodiments it should not be omitted, since there may be a small finite number of metafactories, but an unlimited number of constant types. In addition, verification and result stacking is simpler if the constant type is immediately visible. Compare the "type" operand in 'getfield' calls, which performs a similar function.

A 'CONSTANT_Bytes' constant (new constant tag 2) would create a read-only view (of a type 'ByteSequence' modeled on 'CharSequence') of a series of bytes. The bytes would immediately follow a leading 'u4' size field. In an embodiment, the class file parser and JVM would not parse these bytes at all, but allow bootstrap methods to handle them as desired.

Using these two constant types, plus a well-chosen set of metafactories (bootstrap methods), most, in not all, kinds of constants can be computed.

In an embodiment, there is no call to surface the bytes as a frozen byte array, because that would require certain JVM implementations to perform an extra copy from the class file into the heap.

In an embodiment, one may collapse 'CONSTANT_Dynamic' into 'CONSTANT_InvokeDynamic'. However, in other embodiments, this is not helpful. For example, a 'CONSTANT_InvokeDynamic' cannot be the operand of an 'ldc' and therefore cannot itself serve as a bootstrap method argument. In an embodiment, nested bootstrap method arguments are necessary, for some use cases, to defeat the arity limit for bootstrap methods.

In an embodiment, an issue that may arise from this scheme in certain embodiments is that certain JVMs have the rather odd limit of about 250 constant pool references, as the maximum number of operands available to a bootstrap method. But this can be worked around, by stacking multiple layers of 'CONSTANT_Dynamic' constants.

In an embodiment, a 'CONSTANT_ConstantGroup' constant type may also be useful. This constant type may represent a lengthy sequence (thousands or even millions in some embodiments) of constant values to be surfaced as a 'ConstantSequence' handle, similar to the 'ByteSequence' handle, which metafactories would read and pack into the desired arrays. This sequence would not necessarily be part of the main constant pool, but may be a subsidiary pool-like structure within the class file. However, in other embodiments, since the 'BootstrapSpecifiers' attribute already has a similar structure, it may be useful to use that pre-existing structure, rather than create a new, slightly different one.)

Examples

In an embodiment, example constant pool entries for specifying an array may be as follows. In the examples, AMF references a hypothetical metafactory for generating arrays in general BAMF represents a hypothetical metafactory optimized for generating a specialized type of array (e.g. an array of Boolean values). While such specialized metafactories may exist in some embodiments, it will be recognized that they are not strictly necessary in other embodiments.

AMF
int/specifying data/1
1
5
3

The above example of entries in the constant pool may be used to generate an array of ints using method code produced by the AMF metafactory. Both "int" and "/specifying data/" are passed as static arguments to the referenced metafactory, and affect the method code produced by the AMF to generate the array. "int" is an example of specifying data, which indicates the type of elements found in the array. More complex arrays may have multiple data types, each attached to specific indexed elements within the array. The other "/specifying data/" may include any number of parameters that affect array generation, such as whether the array will be immutable, how the elements within the array are stored in the constant pool (or other memory area), and so forth. The final three entries in the list are actual values of array elements, forming the array {1, 5, 3}.

While the entries shown above are listed sequentially, it will be recognized that in various embodiments, they may be scattered throughout the constant pool or any other suitable data area within a class file. The first entry may include a parameter that references the location of the second entry (or a chain of entries that leads to or collectively yields the second entry), and so forth. Or, in other embodiments, the specifying data may be combined with the reference to the metafactory.

Other examples are as follows. In each example, each entry is separated by a comma. The letter G connotes a single entry (e.g. designated as CONSTANT_Group) that contains references to a group of entries listed in the parentheses. The letter D connotes a single entry that contains bytes (as depicted within parentheses) that, when parsed by the method generated by the AMF metafactory, yield a list of values for the array. "b[ ]" refers to specifying information, in this case indicating an array of binaries.

AMF, b[ ], 1, 0, 1
BAMF, 1, 0, 1
BAMF, G(1, 0, 1)
BAMF, D(05)
BAMF, G(int, 1, 0, 1)

In an embodiment, a semi-constant array or template may be produced. For instance, consider the following code:
Int x= . . .
int[ ] a={1, 4, x, 10};
This code might be compiled to bytecode such as the following.
aload #x
invokedynamic TAMF #123
astore #a In this example, "TAMF" refers to a metafactory for generating template arrays. The constant pool entries #123 as follows:
G(1, 4, -, 10)
Where - is a symbol or other suitable representation for an array element whose value is to be supplied dynamically (e.g. popped from the heap, or supplied from a register or local variable). Alternatively, or additionally, specifying information may be supplied as an attribute of the call that indicates lists the index(es) of elements in the array whose values are to be supplied dynamically.

In an embodiment, responsive to this bytecode, the referenced TAMF metafactory might generate code such as:
mf=λ(z) {return new into {1, 4, z, 10}}

9.0 Third Additional Disclosure

Aspects of the subject matter described herein are set out in the following numbered clauses:

1. A method comprising: identifying, within a set of program instructions, an instruction to load a constant; identifying, based on the instruction to load the constant, a first entry associated with the constant in a data structure that identifies one or more constants used by a program, wherein the first entry specifies at least constant data and a first set of instructions for assembling a value or partial value from the constant data; executing the first set of instructions to assemble the value or the partial value from the constant data; storing a particular value or a reference to the particular value onto a run-time data structure used to pass values or references between sets of instructions executing in a run-time environment, wherein the particular value is based on the value or the partial value assembled from the constant data, wherein the method is performed by one or more computing devices.

2. The method of Clause 1, wherein the constant represents one or more of an array, a group, a sequence, a dictionary, a complex number, a point, or an object.

3. The method of any of Clauses 1-2, wherein the data structure that identifies the one or more constants used by the program is a constant table containing a plurality of entries, wherein each entry of the plurality of entries relates to a different constant.

4. The method of Clause 1, wherein executing the first set of instructions stores the value or the partial value in a constant value cache.

5. The method of Clause 4, wherein the value or the partial value stored in the constant value cache is stored at a memory location where the value or partial value is immutable.

6. The method of Clause 4, wherein executing the first set of instructions generates a second set of instructions which, when executed, generates the particular value based on the value or the partial value stored in the constant value cache and performs the storing of the particular value or the reference to the particular value onto the run-time data structure.

7. The method of Clause 6, wherein the first entry in the data structure includes an assembler reference that points to the first set of instructions and executing the first set of instructions causes the assembler reference to be updated to point to the second set of instructions.

8. The method of Clause 7, further comprising:
identifying, within a second set of program instructions, a second instruction to load the constant; identifying, based on the second instruction to load the constant, the first entry associated with the constant in the data structure that identifies the one or more constants used by the program, wherein the first entry identifies at least the value or partial value in the in the constant value cache and the second set of instructions; executing the second set of instructions to store a second particular value or a reference to the second particular value onto the run-time data structure based on the value or the partial value in the constant value cache.

9. The method of any of Clauses 6-8 wherein executing the first set of instructions assembles the partial value, wherein the partial value is an aggregate containing one or more constant components and one or more variable components, wherein the second set of instructions generates the particular value by performing a block copy of the partial value from the constant value cache to a separate location in run-time memory representing the particular value and one or more copies of variable values from the run-time data structure to replace the one or more variable components.

10. The method of any of Causes 1-9, wherein storing a particular value or a reference to the particular value onto a run-time data structure stores the reference to the particular value onto the run-time data structure.

11. The method of Claim any of Clauses 1-10, wherein the instruction to load the constant includes one or more parameters that determine whether the reference to the particular value points to a mutable location in run-time memory.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

What is claimed is:
1. A method comprising:
identifying, within a set of program instructions, an instruction to load a constant;
identifying, based on the instruction to load the constant, a first entry representing the constant, wherein the first entry is in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value, wherein said data structure contains at least one constant value of said plurality of constant values;
executing the first set of instructions to assemble the complex value or the partial complex value as an aggregation of the constant data;
storing a particular value or a reference to the particular value onto a run-time data structure used to pass values or references between sets of instructions executing in a run-time environment, wherein the particular value is based on the complex value or the partial complex value assembled from the constant data;
identifying, within the set of program instructions, a second instruction to load a second constant;
identifying, based on the second instruction to load the second constant, a second entry associated with the second constant in the data structure that identifies the one or more constants used by the program, wherein the second entry specifies at least second constant data and second set of instructions for assembling a second complex value or a second partial complex value from the second constant data, wherein the second constant data represents a second plurality of constant values used by the second set of instructions to assemble the second complex value or the second partial complex value, wherein the second complex value or the second partial complex value represents an aggregation of the second plurality of constant values, wherein the first set of instructions is different than the second set of instructions;
executing the second set of instructions to assemble the second complex value or the second partial complex value from the second constant data;
storing a second particular value or a second reference to the second particular value onto the run-time data structure, wherein the second particular value is based on the second complex value or the second partial complex value assembled from the second constant data;
wherein the method is performed by one or more computing devices.

2. The method of claim 1, wherein the constant represents one or more of an array, a group, a sequence, a dictionary, a complex number, a point, or an object.

3. The method of claim 2 further comprising a source compiler generating said instruction to load the constant by parsing a literal declaration that specifies contents of said dictionary.

4. The method of claim 1, wherein the data structure that identifies the one or more constants used by the program is a constant table containing a plurality of entries, wherein each entry of the plurality of entries relates to a different constant.

5. The method of claim 1, wherein storing a particular value or a reference to the particular value onto a run-time data structure stores the reference to the particular value onto the run-time data structure.

6. The method of claim 1, wherein the instruction to load the constant includes one or more parameters that determine whether the reference to the particular value points to a mutable location in run-time memory.

7. The method of claim 1 wherein said first entry contains said at least one constant value of said plurality of constant values.

8. The method of claim 1 wherein the first entry specifies the constant data comprises the first entry contains the plurality of constant values.

9. The method of claim 1 wherein:
the first entry specifies the constant data comprises the first entry references one or more particular entries in said data structure;
each entry of said one or more particular entries contains a constant value of said plurality of constant values.

10. The method of claim 1 wherein:
the first entry specifies the constant data comprises the first entry references a particular entry in said data structure;
said particular entry contains the plurality of constant values.

11. The method of claim 1 wherein said constant data is stored in a container of raw bytes.

12. The method of claim 1 wherein the first set of instructions are based on logic that is automatically provided by a source compiler.

13. The method of claim 1 wherein said first set of instructions for assembling the complex value or partial complex value comprises non-determinism.

14. The method of claim 13 wherein said non-determinism comprises generation of a random number.

15. The method of claim 1 wherein said instruction to load the constant comprises an overloaded instruction that can be used to load a complex constant or a native constant.

16. The method of claim 1 wherein said instruction to load the constant comprises a particular instruction that can only be used to load a complex constant.

17. The method of claim 1 wherein said instruction to load the constant comprises a particular instruction that can only be used to load a templated complex constant.

18. The method of claim 1 wherein said instruction to load the constant comprises a particular instruction that can only be used to load a complex constant that is not a templated complex constant.

19. A method comprising:
identifying, within a set of program instructions, an instruction to load a constant;
identifying, based on the instruction to load the constant, a first entry representing the constant in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value;
executing the first set of instructions to assemble the complex value or the partial complex value as an aggregation of the constant data;
wherein executing the first set of instructions stores the complex value or the partial complex value in a constant value cache.

20. The method of claim 12, wherein the complex value or the partial complex value stored in the constant value cache is stored at a memory location where the complex value or partial complex value is immutable.

21. The method of claim 19, wherein executing the first set of instructions generates a third set of instructions which, when executed, generates a particular value based on the complex value or the partial complex value stored in the constant value cache and performs the storing of the particular value or the reference to the particular value onto a run-time data structure.

22. The method of claim 14, wherein the first entry in the data structure includes an assembler reference that points to the first set of instructions and executing the first set of instructions causes the assembler reference to be updated to point to the third set of instructions.

23. The method of claim 15, further comprising:
identifying, within a third set of program instructions, a second instruction to load the constant;
identifying, based on the second instruction to load the constant, the first entry associated with the constant in the data structure that identifies the one or more constants used by the program, wherein the first entry identifies at least the complex value or the partial complex value in the constant value cache and the third set of instructions;
executing the third set of instructions to store a third particular value or a reference to the third particular value onto the run-time data structure based on the complex value or the partial complex value in the constant value cache.

24. The method of claim 21, wherein executing the first set of instructions assembles the partial complex value, wherein the partial complex value is an aggregate containing one or more constant components and one or more variable components, wherein the third set of instructions generates a particular complex value by performing a block copy of the partial complex value from the constant value cache to a separate location in run-time memory representing the particular value and one or more copies of variable values from the run-time data structure to replace the one or more variable components.

25. The method of claim 12 wherein the first set of instructions are contained in said first entry.

26. The method of claim 19 further comprising a source compiler generating said instruction to load the constant by parsing a literal declaration that specifies contents of a dictionary.

27. The method of claim 19 wherein said first set of instructions for assembling the complex value or partial complex value comprises non-determinism.

28. The method of claim 27 wherein said non-determinism comprises generation of a random number.

29. The method of claim 19 wherein said instruction to load the constant comprises an overloaded instruction that can be used to load a complex constant or a native constant.

30. The method of claim 19 wherein said instruction to load the constant comprises a particular instruction that can only be used to load a complex constant.

31. The method of claim 19 wherein said instruction to load the constant comprises a particular instruction that can only be used to load a templated complex constant.

32. The method of claim 19 wherein said instruction to load the constant comprises a particular instruction that can only be used to load a complex constant that is not a templated complex constant.

33. The method of claim 19, wherein the constant represents one or more of an array, a group, a sequence, a dictionary, a complex number, a point, or an object.

34. The method of claim 19, wherein the data structure that identifies the one or more constants used by the program is a constant table containing a plurality of entries, wherein each entry of the plurality of entries relates to a different constant.

35. The method of claim 19 wherein said constant data is stored in a container of raw bytes.

36. The method of claim 19 wherein the first set of instructions are based on logic that is automatically provided by a source compiler.

37. A non-transitory computer-readable medium storing one or more instructions which, when executed, cause one or more processors to perform:
   identifying, within a set of program instructions, an instruction to load a constant;
   identifying, based on the instruction to load the constant, a first entry representing the constant, wherein the first entry is in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value, wherein said data structure contains at least one constant value of said plurality of constant values;
   executing the first set of instructions to assemble the complex value or the partial complex value as an aggregation of the constant data;
   storing a particular value or a reference to the particular value onto a run-time data structure used to pass values or references between sets of instructions executing in a run-time environment, wherein the particular value is based on the complex value or the partial complex value assembled from the constant data;
   identifying, within the set of program instructions, a second instruction to load a second constant;
   identifying, based on the second instruction to load the second constant, a second entry associated with the second constant in the data structure that identifies the one or more constants used by the program, wherein the second entry specifies at least second constant data and second set of instructions for assembling a second complex value or a second partial complex value from the second constant data, wherein the second constant data represents a second plurality of constant values used by the second set of instructions to assemble the second complex value or the second partial complex value, wherein the second complex value or the second partial complex value represents an aggregation of the second plurality of constant values, wherein the first set of instructions is different than the second set of instructions;
   executing the second set of instructions to assemble the second complex value or the second partial complex value from the second constant data;
   storing a second particular value or a second reference to the second particular value onto the run-time data structure, wherein the second particular value is based on the second complex value or the second partial complex value assembled from the second constant data.

38. The non-transitory computer-readable medium of claim 19, wherein the constant represents one or more of an array, a group, a sequence, a dictionary, a complex number, a point, or an object.

39. The non-transitory computer-readable medium of claim 38 wherein the one or more instructions further cause a source compiler generating said instruction to load the constant by parsing a literal declaration that specifies contents of said dictionary.

40. The non-transitory computer-readable medium of claim 19, wherein the data structure that identifies the one or more constants used by the program is a constant table containing a plurality of entries, wherein each entry of the plurality of entries relates to a different constant.

41. The non-transitory computer-readable medium of claim 37, wherein storing a particular value or a reference to the particular value onto a run-time data structure stores the reference to the particular value onto the run-time data structure.

42. The non-transitory computer-readable medium of claim 37, wherein the instruction to load the constant includes one or more parameters that determine whether the reference to the particular value points to a mutable location in run-time memory.

43. The non-transitory computer-readable medium of clam 37 wherein said first entry contains said at least one constant value of said plurality of constant values.

44. The non-transitory computer-readable medium of claim 37 wherein the first entry specifies the constant data comprises the first entry contains the plurality of constant values.

45. The non-transitory computer-readable medium of claim 37 wherein:
   the first entry specifies the constant data comprises the first entry references one or more particular entries in said data structure;
   each entry of said one or more particular entries contains a constant value of said plurality of constant values.

46. The non-transitory computer-readable medium of claim 37 wherein:
   the first entry specifies the constant data comprises the first entry references a particular entry in said data structure;
   said particular entry contains the plurality of constant values.

47. The non-transitory computer-readable medium of claim 37 wherein said constant data is stored in a container of raw bytes.

48. The non-transitory computer-readable medium of claim 37 wherein the first set of instructions are based on logic that is automatically provided by a source compiler.

49. The non-transitory computer-readable medium of claim 37 wherein said first set of instructions for assembling the complex value or partial complex value comprises non-determinism.

50. The non-transitory computer-readable medium of claim 49 wherein said non-determinism comprises generation of a random number.

51. The non-transitory computer-readable medium of claim 37 wherein said instruction to load the constant comprises an overloaded instruction that can be used to load a complex constant or a native constant.

52. The non-transitory computer-readable medium of claim 37 wherein said instruction to load the constant comprises a particular instruction that can only be used to load a complex constant.

53. The non-transitory computer-readable medium of claim 37 wherein said instruction to load the constant comprises a particular instruction that can only be used to load a templated complex constant.

54. The non-transitory computer-readable medium of claim 37 wherein said instruction to load the constant comprises a particular instruction that can only be used to load a complex constant that is not a templated complex constant.

55. A non-transitory computer-readable medium storing one or more instructions that, when executed by one or more processors, cause:
identifying, within a set of program instructions, an instruction to load a constant;
identifying, based on the instruction to load the constant, a first entry representing the constant in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value;
executing the first set of instructions to assemble the complex value or the partial complex value as an aggregation of the constant data;
wherein executing the first set of instructions stores the complex value or the partial complex value in a constant value cache.

56. The non-transitory computer-readable medium of claim 55, wherein the complex value or the partial complex value stored in the constant value cache is stored at a memory location where the complex value or partial complex value is immutable.

57. The non-transitory computer-readable medium of claim 55, wherein executing the first set of instructions generates a third set of instructions which, when executed, generates a particular value based on the complex value or the partial complex value stored in the constant value cache and performs the storing of the particular value or the reference to the particular value onto a run-time data structure.

58. The non-transitory computer-readable medium of claim 57, wherein the first entry in the data structure includes an assembler reference that points to the first set of instructions and executing the first set of instructions causes the assembler reference to be updated to point to the third set of instructions.

59. The non-transitory computer-readable medium of claim 58, wherein the one or more instructions further cause:
identifying, within a third set of program instructions, a second instruction to load the constant;
identifying, based on the second instruction to load the constant, the first entry associated with the constant in the data structure that identifies the one or more constants used by the program, wherein the first entry identifies at least the complex value or the partial complex value in the constant value cache and the third set of instructions;
executing the third set of instructions to store a third particular value or a reference to the third particular value onto the run-time data structure based on the complex value or the partial complex value in the constant value cache.

60. The non-transitory computer-readable medium of claim 57, wherein executing the first set of instructions assembles the partial complex value, wherein the partial complex value is an aggregate containing one or more constant components and one or more variable components, wherein the third set of instructions generates a particular complex value by performing a block copy of the partial complex value from the constant value cache to a separate location in run-time memory representing the particular value and one or more copies of variable values from the run-time data structure to replace the one or more variable components.

61. The non-transitory computer-readable medium of claim 15 wherein the first set of instructions are contained in said first entry.

62. A method comprising:
identifying, within a set of program instructions, an instruction to load a first constant;
identifying, based on the instruction to load the first constant, a first entry representing the first constant in a data structure that identifies one or more constants used by a program, wherein the first entry specifies at least first constant data and a first set of instructions for assembling a first complex value or first partial complex value from the first constant data, wherein the first constant data represents a first plurality of constant values used by the first set of instructions to assemble the first complex value or the first partial complex value;
executing the first set of instructions to assemble the first complex value or the first partial complex value as a first aggregation of the first constant data;
storing a first particular value or a reference to the first particular value onto a run-time data structure used to pass values or references between sets of instructions executing in a run-time environment, wherein the first particular value is based on the first complex value or the first partial complex value assembled from the first constant data;
identifying, within the set of program instructions, a second instruction to load a second constant;
identifying, based on the second instruction to load the second constant, said first entry and a second entry associated with the second constant in the data structure that identifies one or more constants used by the program, wherein the second entry specifies at least second constant data and second set of instructions for assembling a second complex value or a second partial complex value from the second constant data and the first particular value, wherein the second constant data represents a second plurality of constant values used by the second set of instructions to assemble the second complex value or the second partial complex value, wherein the second complex value or the second partial complex value represents an aggregation of the second plurality of constant values and the first particular value, wherein the first set of instructions is different than the second set of instructions;

executing the second set of instructions to assemble the second complex value or the second partial complex value from the second constant data and the first particular value;

storing a second particular value or a second reference to the second particular value onto the run-time data structure, wherein the second particular value is based on the second complex value or the second partial complex value assembled from the second constant data and the first particular value;

wherein the method is performed by one or more computing devices.

63. A method comprising:

identifying, within a set of program instructions, an instruction to load a constant;

identifying, based on the instruction to load the constant, a first entry representing the constant in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value;

executing the first set of instructions to assemble the complex value or the partial complex value as an aggregation of the constant data;

storing the complex value or the partial complex value into a run-time data structure used to pass values between sets of instructions executing in a run-time environment, wherein a particular value is based on the complex value or the partial complex value assembled from the constant data, wherein the run-time data structure comprises at least one of: one or more local variables, or a structure that is specific to an individual thread;

wherein the method is performed by one or more computing devices.

64. A method comprising:

identifying, within a set of program instructions, an instruction to load a constant;

identifying, based on the instruction to load the constant, a first entry associated with the constant in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value, wherein the complex value or the partial complex value represents an aggregation of the plurality of constant values;

executing the first set of instructions to assemble the complex value or the partial complex value from the constant data;

wherein executing the first set of instructions stores:
 the complex value or the partial complex value in a heap, and
 a reference to the complex value or the partial complex value in a constant value cache.

65. The method of claim 64 wherein:

said first set of instructions stores the complex value or the partial complex value in the heap comprises said first set of instructions stores the complex value or the partial complex value in the heap when a size of the complex value or the partial complex value exceeds a threshold;

otherwise the method further comprises said first set of instructions instead stores the complex value or the partial complex value outside of the heap when the size of the complex value or the partial complex value does not exceed the threshold.

66. The method of claim 65 wherein:

said first set of instructions stores the complex value or the partial complex value in the heap comprises said first set of instructions pass the complex value or the partial complex value by reference;

otherwise said first set of instructions instead stores the complex value or the partial complex value outside of the heap comprises said first set of instructions pass the complex value or the partial complex value by value.

67. A non-transitory computer-readable medium storing one or more instructions that, when executed by one or more processors, cause:

identifying, within a set of program instructions, an instruction to load a first constant;

identifying, based on the instruction to load the first constant, a first entry representing the first constant in a data structure that identifies one or more constants used by a program, wherein the first entry specifies at least first constant data and a first set of instructions for assembling a first complex value or first partial complex value from the first constant data, wherein the first constant data represents a first plurality of constant values used by the first set of instructions to assemble the first complex value or the first partial complex value;

executing the first set of instructions to assemble the first complex value or the first partial complex value as a first aggregation of the first constant data;

storing a first particular value or a reference to the first particular value onto a run-time data structure used to pass values or references between sets of instructions executing in a run-time environment, wherein the first particular value is based on the first complex value or the first partial complex value assembled from the first constant data;

identifying, within the set of program instructions, a second instruction to load a second constant;

identifying, based on the second instruction to load the second constant, said first entry and a second entry associated with the second constant in the data structure that identifies one or more constants used by the program, wherein the second entry specifies at least second constant data and second set of instructions for assembling a second complex value or a second partial complex value from the second constant data and the first particular value, wherein the second constant data represents a second plurality of constant values used by the second set of instructions to assemble the second complex value or the second partial complex value, wherein the second complex value or the second partial complex value represents an aggregation of the second plurality of constant values and the first particular value, wherein the first set of instructions is different than the second set of instructions;

executing the second set of instructions to assemble the second complex value or the second partial complex value from the second constant data and the first particular value;

storing a second particular value or a second reference to the second particular value onto the run-time data structure, wherein the second particular value is based on the second complex value or the second partial complex value assembled from the second constant data and the first particular value.

68. A non-transitory computer-readable medium storing one or more instructions that, when executed by one or more processors, cause:
- identifying, within a set of program instructions, an instruction to load a constant;
- identifying, based on the instruction to load the constant, a first entry representing the constant in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value;
- executing the first set of instructions to assemble the complex value or the partial complex value as an aggregation of the constant data;
- storing the complex value or the partial complex value into a run-time data structure used to pass values between sets of instructions executing in a run-time environment, wherein a particular value is based on the complex value or the partial complex value assembled from the constant data, wherein the run-time data structure comprises at least one of: one or more local variables, or a structure that is specific to an individual thread.

69. A non-transitory computer-readable medium storing one or more instructions that, when executed by one or more processors, cause:
- identifying, within a set of program instructions, an instruction to load a constant;
- identifying, based on the instruction to load the constant, a first entry associated with the constant in a data structure that identifies one or more constants used by a program, wherein the first entry specifies at least constant data and a first set of instructions for assembling a complex value or partial complex value from the constant data, wherein the constant data represents a plurality of constant values used by the first set of instructions to assemble the complex value or the partial complex value, wherein the complex value or the partial complex value represents an aggregation of the plurality of constant values;
- executing the first set of instructions to assemble the complex value or the partial complex value from the constant data;
- wherein executing the first set of instructions stores:
  - the complex value or the partial complex value in a heap, and
  - a reference to the complex value or the partial complex value in a constant value cache.

70. The non-transitory computer-readable medium of claim 69 wherein:
- said first set of instructions stores the complex value or the partial complex value in the heap comprises said first set of instructions stores the complex value or the partial complex value in the heap when a size of the complex value or the partial complex value exceeds a threshold;
- otherwise the one or more instructions further cause said first set of instructions instead stores the complex value or the partial complex value outside of the heap when the size of the complex value or the partial complex value does not exceed the threshold.

71. The non-transitory computer-readable medium of claim 70 wherein:
- said first set of instructions stores the complex value or the partial complex value in the heap comprises said first set of instructions pass the complex value or the partial complex value by reference;
- otherwise said first set of instructions instead stores the complex value or the partial complex value outside of the heap comprises said first set of instructions pass the complex value or the partial complex value by value.

* * * * *

UNITED STATES PATENT AND TRADEMARK OFFICE
CERTIFICATE OF CORRECTION

| | |
|---|---|
| PATENT NO. | : 10,540,148 B2 |
| APPLICATION NO. | : 14/726155 |
| DATED | : January 21, 2020 |
| INVENTOR(S) | : Rose et al. |

Page 1 of 2

It is certified that error appears in the above-identified patent and that said Letters Patent is hereby corrected as shown below:

On the Title Page

On page 2, Column 1, under Other Publications, Line 1, delete ""InvokeDynannic" and insert -- "InvokeDynamic --, therefor.

In the Specification

In Column 1, Line 6, delete "Jul." and insert -- Jun. --, therefor.

In Column 5, Line 28, delete "variables," and insert -- variables. --, therefor.

In Column 23, Line 25, delete "Composibility" and insert -- Composability --, therefor.

In Column 23, Lines 36-37, delete "composible," and insert -- composable, --, therefor.

In Column 24, Lines 13-14, delete "composible" and insert -- composable --, therefor.

In Column 31, Line 53, delete "general" and insert -- general. --, therefor.

In Column 31, Line 60, delete "data/1" and insert -- data/ --.

In the Claims

In Column 36, Line 11, in Claim 20, delete "claim 12," and insert -- claim 19, --, therefor.

In Column 36, Line 23, in Claim 22, delete "claim 14," and insert -- claim 21, --, therefor.

In Column 36, Line 28, in Claim 23, delete "claim 15," and insert -- claim 22, --, therefor.

In Column 36, Line 54, in Claim 25, delete "claim 12" and insert -- claim 19 --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,540,148 B2

In Column 38, Line 11, in Claim 38, delete "claim 19," and insert -- claim 37, --, therefor.

In Column 38, Line 20, in Claim 40, delete "claim 19," and insert -- claim 37, --, therefor.

In Column 38, Line 35, in Claim 43, delete "clam" and insert -- claim --, therefor.

In Column 40, Line 23, in Claim 61, delete "claim 15" and insert -- claim 55 --, therefor.